March 11, 1947. W. F. STREHLOW 2,417,139
VARIABLE WHEEL TREAD VEHICLE
Filed Feb. 19, 1945 6 Sheets-Sheet 3

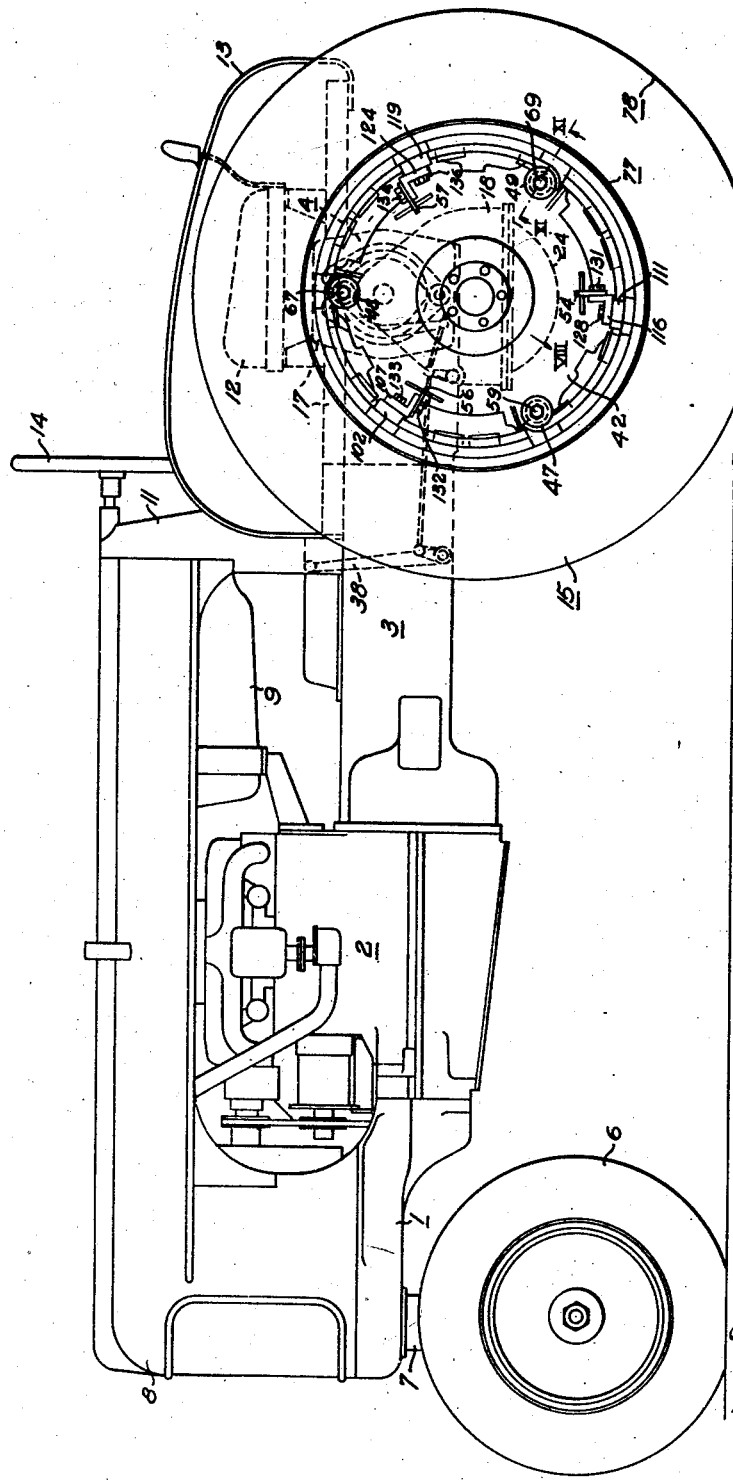

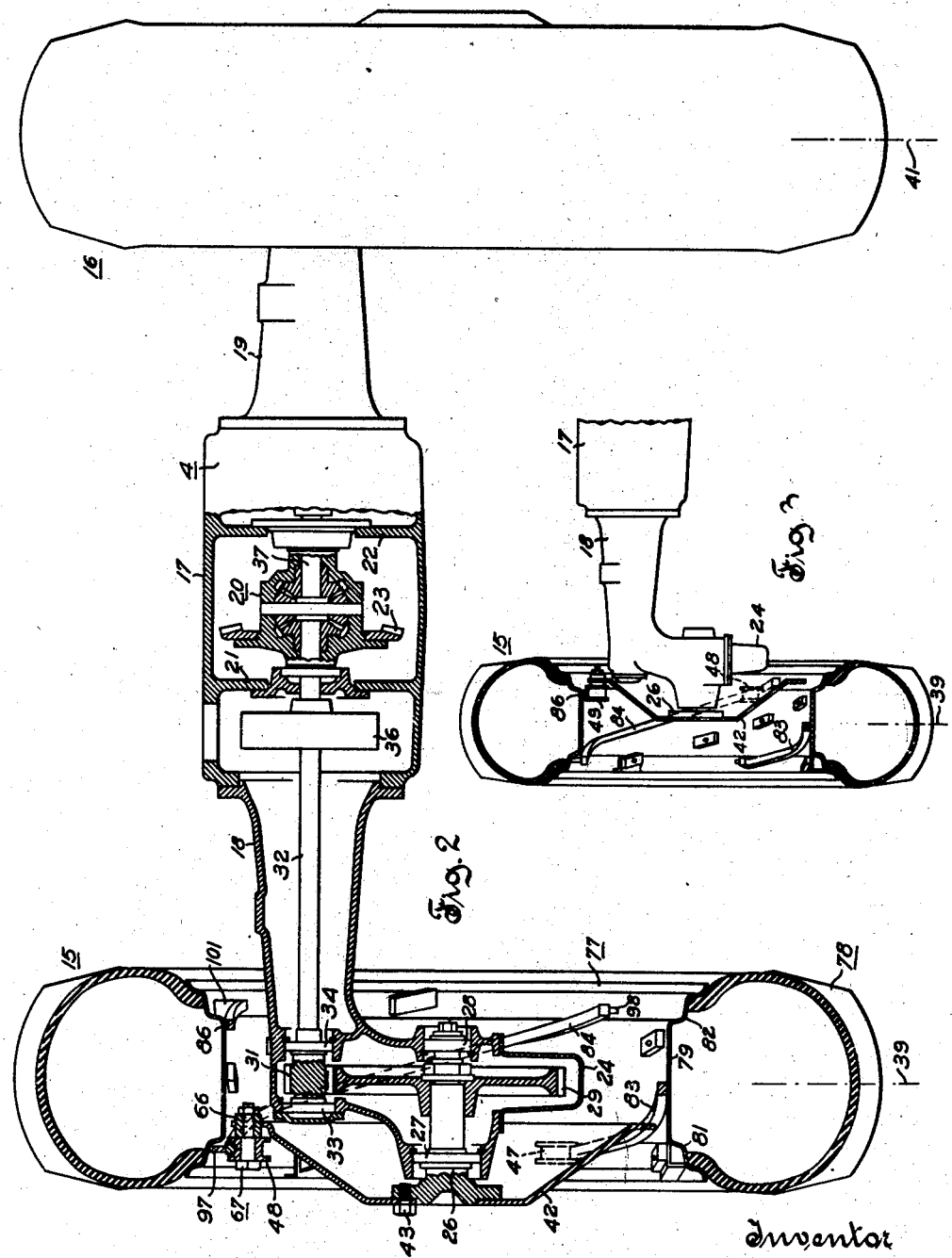

Inventor
Walter F. Strehlow
by  W. Fiersch
Attorney

March 11, 1947. W. F. STREHLOW 2,417,139
VARIABLE WHEEL TREAD VEHICLE
Filed Feb. 19, 1945 6 Sheets-Sheet 4
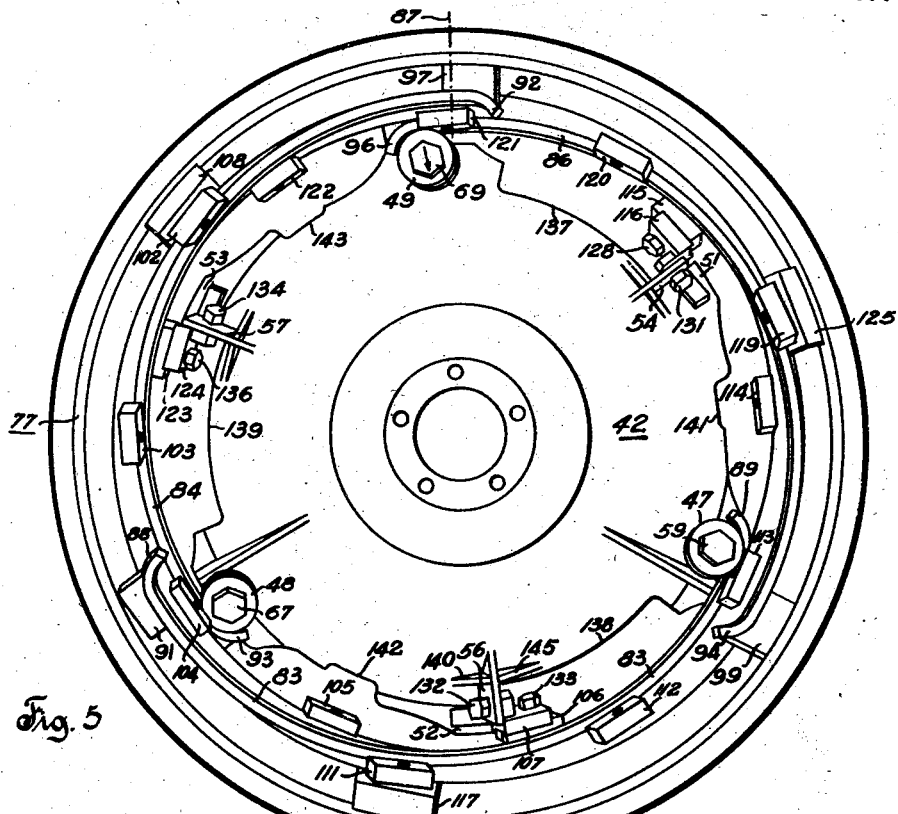
Fig. 5
Fig. 7
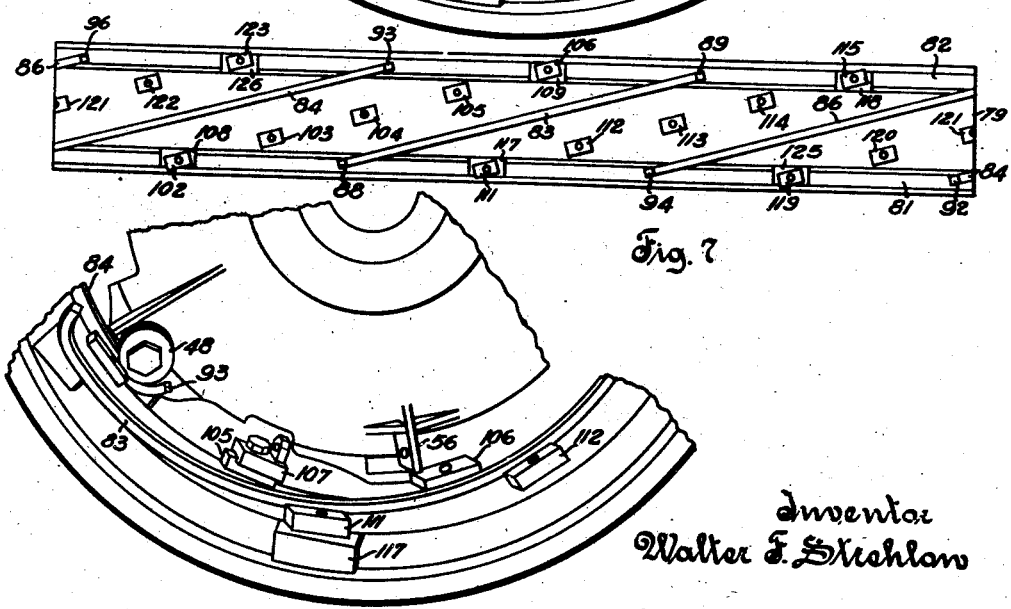
Fig. 6
Inventor
Walter F. Strehlow
by
Attorney

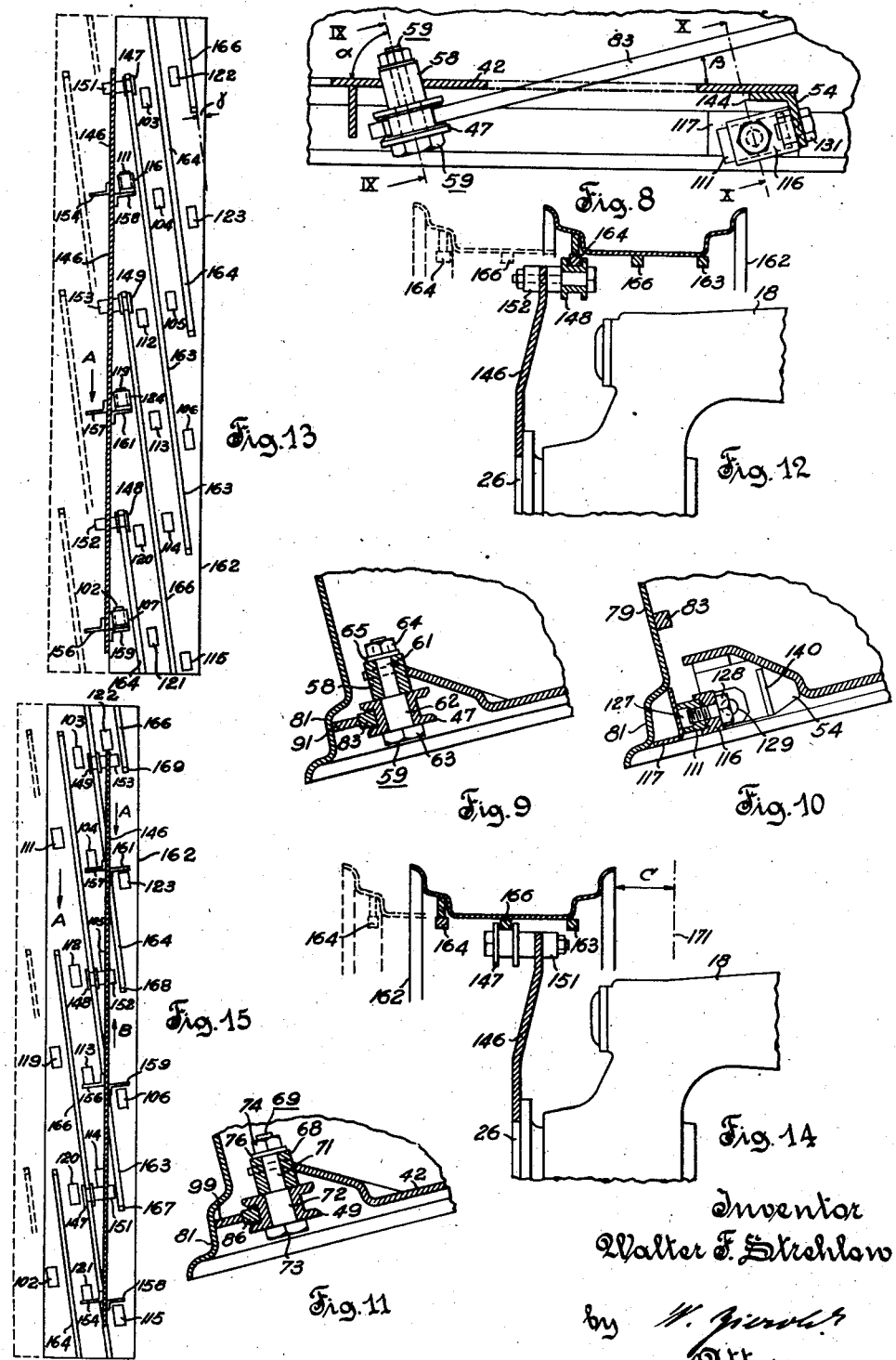

March 11, 1947.  W. F. STREHLOW  2,417,139
VARIABLE WHEEL TREAD VEHICLE
Filed Feb. 19, 1945  6 Sheets-Sheet 6
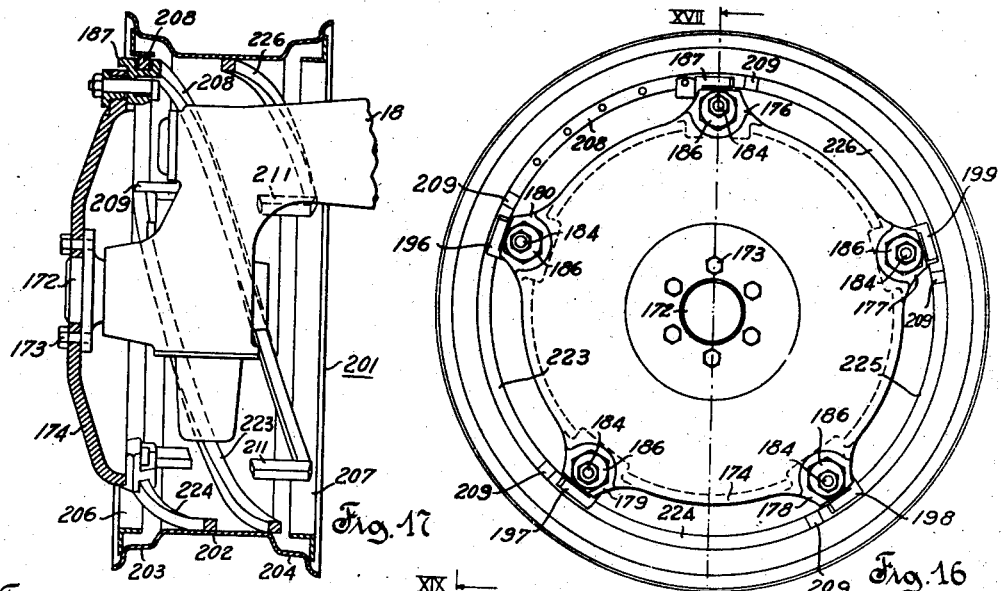
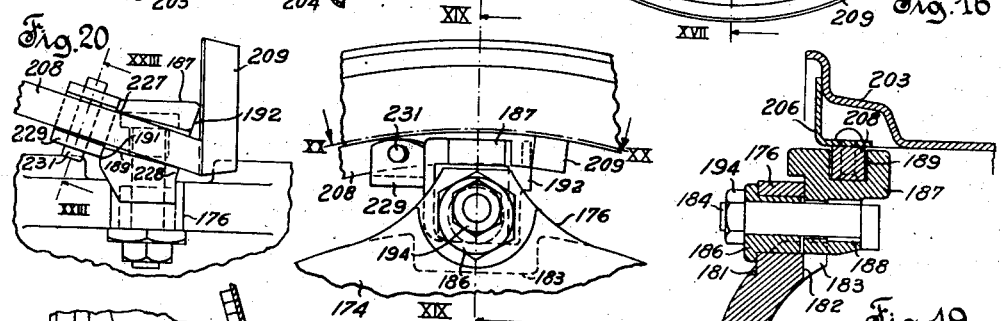
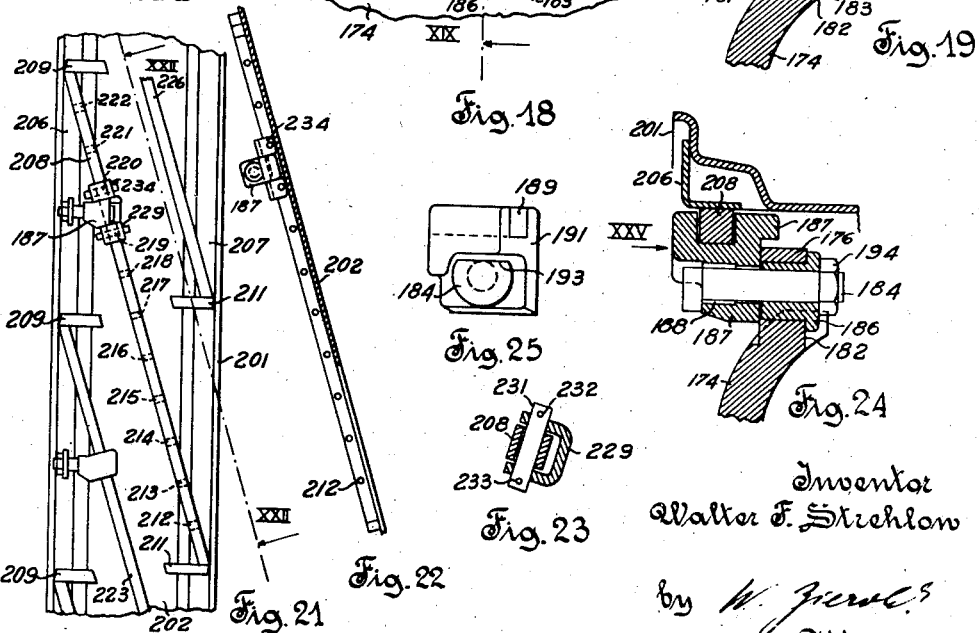
Inventor
Walter F. Strehlow
by
Attorney Patented Mar. 11, 1947

2,417,139

UNITED STATES PATENT OFFICE 2,417,139

VARIABLE WHEEL TREAD VEHICLE

Walter F. Strehlow, Wauwatosa, Wis., assignor to Allis-Chalmers Manufacturing Company, Milwaukee, Wis., a corporation of Delaware Application February 19, 1945, Serial No. 578,582

38 Claims. (Cl. 180—75)

The invention relates to vehicles and more particularly to vehicles of the type in which the span between a pair of transversely spaced supporting wheels may be adjusted so as to widen and narrow the tread spacing of such wheels.

Attempts have been made in the past to provide a satisfactory variable-tread wheel-supported vehicle, such as a tractor, wherein the tread may be adjusted through the application of engine power and without necessity of jacking up the vehicle preparatory to the tread-adjusting operation. However, such attempts up to this time have failed to produce a mechanically and commercially satisfactory solution of the problems involved, and more particularly to incorporate the desired features successfully in a tractor of utility for general farm purposes in which the tread is adjustable to conform with different crop row spacings and which affords maximum clearance for row plants over which the tractor operates, as in cultivating. The present invention contemplates the provision of a mechanically and commercially satisfactory variable-tread wheel-supported tractor which avoids the shortcomings and inadequacies of the prior art and which constitutes a novel and extremely useful apparatus.

It is a general object of the invention to provide a wheel-supported vehicle of the adjustable tread type in which a rotatable radial, inner wheel part, usually in the form of a disk, is mounted in axially fixed position on a supporting axle carried by the vehicle body and is surrounded by an annular outer wheel part, usually in the form of a rubber tire and rim assembly, and in which the outer wheel part is connected with the inner wheel part through an improved form of adjustable connection which greatly facilitates and expedites the work of varying the vehicle tread.

A further object of the invention is to provide a tractor of the adjustable tread type which will be efficient and reliable in operation and whose manufacturing costs will not be materially increased over that of a fixed tread tractor.

More specifically, it is an object of the invention to provide an improved design and construction of wheel parts of an adjustable tread wheel of a type including inner and outer wheel parts, in which the outer wheel part is operatively supported on the inner wheel part in axially shiftable relation thereto, and in which the inner wheel part has an actuating connection with the outer wheel part which will be operable by relative rotation of the wheel parts to move the outer wheel part axially on the inner wheel part within a suitable range to afford the desired tread adjustment.

A further object of the invention is to provide in an assembly of inner and outer wheel parts of an adjustable tread wheel an improved arrangement for controlling the transmission of torque from one wheel part to the other so as to provide for rotation of one of the wheel parts relative to the other when it is desired to change the vehicle tread, and also for rotation of both wheel parts as a unit in forward and reverse directions during normal operation of the vehicle after the outer wheel part has been adjusted to any desired tread position.

A further object of the invention is to provide a torque control arrangement of the character set forth hereinbefore, which will permit variation of the range between the end positions to which the outer wheel part may be moved by relative rotation of the wheel parts and which will automatically establish a circumferential driving connection between the wheel parts upon adjustment of the outer wheel part to one or either of said end positions and be effective to transmit torque from one wheel part to the other through the mentioned driving connection without subjecting said wheel parts to appreciable axial thrust upon each other.

A further object of the invention is to provide an adequate mounting for the outer wheel part on the inner wheel part which will render the improved wheel assembly adapted for use in motor vehicles, and particularly for the purpose of changing the tread spacing of the propelling wheels without jacking up the vehicle, and whereby upon application of the driving torque of the engine to the inner wheel part the outer wheel part may be moved on the inner wheel part from one tread position to another.

A further object of the invention is to provide a mounting for the outer wheel part on the inner wheel part as set forth hereinbefore, which will be operable to afford slight radial and axial play between the wheel parts to facilitate relative rotation of the wheel parts when it is desired to change the vehicle tread, and also to entirely eliminate said radial and axial play after the outer wheel part has been adjusted to any desired tread position, so that the wheel parts will be positioned in properly fixed relation to each other in normal operation of the vehicle.

A further object of the invention is to provide an improved wheel assembly of the character set forth hereinbefore, in which the outer wheel part will be adjustable axially between certain limits, and in which said limits may be shifted in unison selectively towards one side or the other of the inner wheel part, to thereby provide an arrangement wherein it will be possible to axially adjust the outer wheel part within one range from one limit position affording a minimum tread spacing to another limit position affording a wider tread spacing, and alternatively within another range from one limit position affording a relatively wide tread spacing, to another limit position affording a still wider tread spacing.

A further object of the invention is to provide a wheel assembly affording two ranges of axial adjustment for the outer wheel part, as set forth hereinbefore, and in which a plurality of circumferentially spaced connections between the inner and outer wheel parts may be altered individually and successively while the wheel remains in active vehicle-supporting position and the wheel parts are kept in the same axial relation to each other, in order to selectively dispose the outer wheel part for adjustment within one range or the other.

A further object of the invention is to provide an improved wheel assembly of the character set forth hereinbefore which will be axially compact and which, in that respect, will afford an advantage which is particularly desirable in vehicles, such as farm tractors, wherein axial compactness of the wheel assemblies as for instance compactness of such degree as is obtained in a tractor of the type disclosed in U. S. Patent 2,254,358, dated September 2, 1941, and granted to C. E. Frudden and W. F. Strehlow, is desirable in order to provide for proper plant clearance in straddle row operations, such as cultivating.

The foregoing and other objects and advantages of the invention will become more fully apparent from the following description of several embodiments of the invention shown in the accompanying drawings. Referring to the drawings, in which like reference characters designate the same or similar parts in the various views:

Fig. 1 is a side view of a variable-tread farm tractor, the near rear wheel shown at the left side of the tractor being adjusted to a narrow-tread position;

Fig. 2 is an enlarged view, partly in section, of the rear support of the tractor shown in Fig. 1, the rear wheels of the tractor being shown in narrow tread positions;

Fig. 3 is a partial view, at a reduced scale, of the rear support of the tractor shown in Fig. 1, showing the rear wheel at the left side of the tractor adjusted to a wide tread position;

Fig. 5 is a perspective full side view of the wheel shown in Fig. 4, the view being taken from the same side of the wheel as Fig. 4 and showing the body and rim parts of the wheel in the same relative position in which they are shown in Fig. 4;

Fig. 6 is a perspective view of part of the wheel shown in Fig. 5, illustrating a step of the tread adjusting operation;

Fig. 7 shows a rim development of the wheel shown in Figs. 4 and 5;

Fig. 8 shows a sectional view of the tractor rear wheel shown in Fig. 1, the view being taken in the direction of arrow VIII in Fig. 1 and showing a development of a peripheral part of the wheel body and of the underlying part of the wheel rim;

Fig. 9 shows a section on line IX—IX of Fig. 8;

Fig. 10 shows a section on line X—X of Fig. 8;

Fig. 11 shows an enlarged section on line XI—XI of Fig. 1;

Fig. 12 is a fragmentary sectional view of a first modification of the wheel assembly shown in Figs. 4 and 5, the wheel body and rim being shown in full lines in a relative position affording a minimum tread, and a shifted position of the rim affording a wider tread being indicated in dotted lines;

Figure 4:
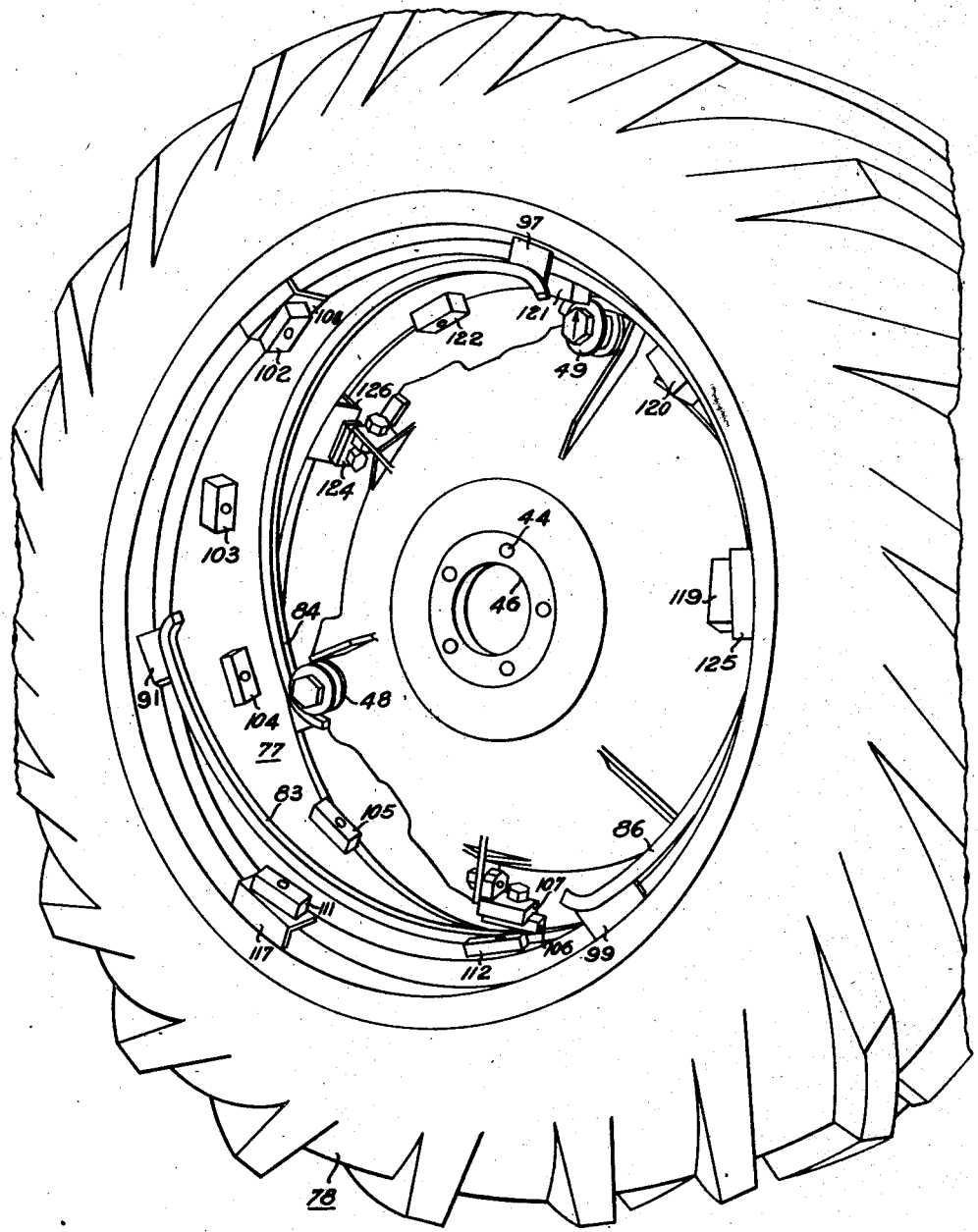
Fig. 4 is an enlarged perspective three-quarter side view of the left rear wheel of the tractor shown in Fig. 1, Fig. 4 showing the body and rim parts of said wheel adjusted to the same relative position as shown in Fig. 3.

Fig. 13 shows a development of the peripheral portion of the wheel body shown in Fig. 12 and a development of the associated wheel rim, the relative position of the wheel body and rim as shown in full lines in the developed view of Fig. 13 being the same as the relative position of the wheel body and rim as shown in full lines on Fig. 12, and the shifted position of the rim relative to the wheel body as indicated in dotted lines in Fig. 13 being the same as the shifted position of the rim indicated in dotted lines in Fig. 12;

Figs. 14 and 15 are views similar to Figs. 12 and 13, respectively, and illustrate a relative arrangement of the wheel body and rim which permits adjustment of the wheel rim to a position affording a still wider tread than that which is indicated in dotted lines in Figs. 12 and 13;

Fig. 16 shows a second modification of the wheel assembly shown in Figs. 4 and 5, Fig. 16 being a full side view of the modified wheel assembly and taken from the same side of the wheel as Fig. 5;

Fig. 17 shows a section on line XVII—XVII of Fig. 16 and also part of the rear axle housing of the tractor shown in Fig. 1;

Fig. 18 is an enlarged view of a detail of the modified wheel assembly shown in Fig. 16;

Fig. 19 shows a section on line XIX—XIX of Fig. 18;

Fig. 20 is a top view of the parts shown below the line XX—XX in Fig. 18;

Fig. 21 shows a development of part of the wheel rim shown in Figs. 16 and 17 and parts cooperating therewith;

Fig. 22 shows a section on line XXII—XXII of Fig. 21;

Fig. 23 shows a section on line XXIII—XXIII of Fig. 20;

Fig. 24 is a view similar to Fig. 19 showing a runner part in a position of adjustment different from that in which it is shown in Fig. 19; and Fig. 25 is a side view of parts in Fig. 24, the view being taken in the direction of arrow XXV in Fig. 24.

The term "tricycle type tractor" commonly denotes a certain type of farm tractor in which the body structure of the tractor is supported at its forward end on a pair of closely spaced front wheels, or on a single centrally located front wheel, and in which the rear end of the body structure is supported on a pair of propelling wheels which are so arranged that they will run at opposite sides of the track of the front wheels or wheel. In order to adapt a tractor of this type for straddle row operations, such as cultivating, the front wheels or wheel are suitably proportioned and arranged so as to run in the space between two adjacent plant rows, and the rear wheels are proportioned and spaced a suitable distance from each other so that they will run in the spaces between plant rows at the right and left sides, respectively, of the tractor. Assuming, as an example, that the tractor is to straddle two plant rows and that the plant row spacing, that is, the distance between the centers of the plant rows, is 34 inches, the proper tread spacing of the rear wheels in that case, that is, the distance between the track centers of the rear wheels would be about 68 inches. It is further usual in tractors of this type to provide for variation or adjustment of the tread spacing of the rear wheels so that the same tractor may be used for straddle row operations on crops of different row spacings. In a tractor having such provisions the tread spacing of the rear wheels may be reduced for instance, from the mentioned 68 inches, to say, 64 inches in which case the tractor would be adapted to straddle two plant rows which are spaced 32 inches apart, or the tread spacing of the rear wheels may be increased to, say, 74 inches, in which case the tractor would be adapted to straddle two plant rows which are spaced 37 inches apart. While traveling along the straddled plant rows the body structure of the tractor, and particularly the portion thereof extending transversely between its rear wheels, must clear the straddled plant rows, and for that purpose two types of construction have heretofore been employed. One of these constructions provides the necessary plant clearance by mounting a substantially straight rear axle structure on wheels of relatively large diameter, and the other construction provides the necessary plant clearance by mounting an upwardly arched rear axle structure on wheels of relatively small diameter.

Fig. 1 of the drawings shows a general outline of a farm tractor, and more particularly of a tractor of the tricycle type discussed hereinbefore in which the rear wheels are mounted on an upwardly arched axle structure, see Fig. 2. The tractor as shown on Fig. 1 is of the familiar frameless type and its body structure comprises four main units, namely, a forward bracket unit generally indicated by the reference character 1, an engine unit 2, a torque tube unit 3, and a transmission and rear axle unit 4. A pair of closely spaced centrally located front wheels 6 are steerably mounted on a depending spindle support 7 of the bracket unit 1, and a radiator shell 8 enclosing a radiator and other accessories, not shown, is mounted on top of the bracket unit 1. A fuel tank 9 for the engine, a steering wheel support 11, an operator's seat 12 and rear wheel fenders 13 are suitably mounted on the body structure of the tractor. A steering wheel 14 is mounted on the steering wheel support 11 within reach from the operator's seat 12 and is operatively connected with the front wheels 6 through a suitable mechanism, not shown.

Referring to Fig. 2, the rear wheels of the tractor are generally indicated by the reference characters 15 and 16. The transmission and rear axle unit 4 on which the rear wheels are mounted comprises a central housing section 17 and two elbow sections 18 and 19 which are secured to the housing section 17 so as to extend laterally therefrom in opposite directions, the elbow section 18 being piloted in a hole of the left side wall of the housing section 17 and retained in place by a circumferential series of studs and nuts (not shown), and the elbow section 19 being similarly secured to the right side wall of the housing section 17. As indicated in Fig. 1, the housing section 17 is secured at its forward end to the rear end of the torque tube unit 3, and a change speed transmission mechanism, not shown, is enclosed within the forward part of the housing section 17. The rearward part of the housing section 17, to which the elbow sections 18 and 19 are secured, see Fig. 2, encloses a differential mechanism 20 of conventional construction which is rotatably mounted in partitions 21 and 22 of the housing section 17. The spider cage of the differential 20 carries a bevel ring gear 23, and suitable provisions are made for transmitting power from the engine 2 to the ring gear 23 in conformity with established practice such as disclosed, for instance, in the mentioned Frudden and Strehlow Patent No. 2,254,358. While the intervening mechanism between the engine 2 and the ring gear 23 is not shown, it will be understood that the change speed transmission enclosed in the forward part of the housing section 17 has an intake shaft connected with a propeller shaft within the housing of the torque tube section 3, and an output shaft geared to the ring gear 23, and that the propeller shaft is connectable with and disconnectable from the crank shaft of the engine 2 by means of a master clutch enclosed within the forward housing portion of the torque tube unit 3.

As shown in Fig. 2 the elbow section 18 of the rear axle structure comprises a horizontal tubular portion and a depending casing portion at the outer end of the tubular portion, the lower end of the casing portion being closed by a drop pan 24. A shaft 26 which forms an axle for the rear wheel 15 at the left side of the tractor is rotatably mounted on the depending casing portion of the elbow section 18 by means of transversely spaced roller bearings 27 and 28 which are mounted, respectively, in opposite side walls of the casing portion and cooperate with the shaft and with the casing portion so as to rotatably support the shaft 26 in axially fixed position on the tractor. A spur gear 29 is keyed or splined on the shaft 26 within the casing portion of the elbow section 18 and meshes with a pinion 31 on a pinion shaft 32, the pinion 31 being non-rotatably connected with the shaft 32 and preferably formed integrally therewith. A pair of roller bearings 33 and 34 at opposite sides, respectively, of the pinion 31 are operatively interposed between the shaft 32 and the elbow section 18 to rotatably mount the pinion shaft coaxially with the tubular portion of the elbow section and to secure it in an axially fixed position thereon. The shaft 32 is operatively connected with the differential 20, that is, it extends through the hub of the differential cage and has a splined portion at its inner end which is telescopically fitted into the splined hub of one of the differential pinions. A brake drum 36 is non-rotatably secured to the pinion shaft 32 in axially fixed position thereon within a dry compartment of the housing section 17 at the left side of the latter.

The elbow section 19 is an opposite hand duplicate of the elbow section 18 and encloses a final drive mechanism the same as described hereinbefore in connection with the elbow section 18. A pinion shaft 37 corresponding to the pinion shaft 32 extends axially through the tubular portion of the elbow section 19 and is operatively connected with the differential 20 in axial alinement with the pinion shaft 32. Generally, the arched rear axle structure and the enclosed mechanism shown in Fig. 2 are similar to the arched rear axle structure and enclosed mechanism shown in the mentioned Frudden and Strehlow Patent No. 2,254,358, and the operation of the differential and final drive mechanisms for transmitting power to the axle shaft 26 of the left rear wheel 15 and to the corresponding axle shaft (not shown) of the right rear wheel 16 will be readily understood without further explanation. Suitable brake mechanisms are provided for locking one or the other or both of the pinion shafts 32 and 37, the brake mechanism for the left pinion shaft 32 including the mentioned brake drum 36 and a brake pedal 38 which is indicated in Fig. 1, and the brake mechanism for the right pinion shaft 37 includes a similar brake drum and brake pedal, not shown.

The dash-dotted lines 39 and 41 in Fig. 2 indicate the track centers of the rear wheels 15 and 16, respectively, and the transverse spacing of said track centers represents the tread spacing of the rear wheels 15 and 16. As shown in Fig. 2 the track center 39 of the wheel 15 coincides substantially with the center plane of the gear 29, and Fig. 3 shows the wheel 15 adjusted to a position in which a vertical plane through its track center 39 intersects the axis of the axle 26 at a point in proximity to the outer end of the axle 26. Provisions for shifting the track center 39 of the wheel 15 from one of the mentioned positions to the other, and vice versa, and to a plurality of intermediate positions, are incorporated in the wheel 15, as will be explained in detail hereinbelow, and the wheel 16 is similarly constructed to provide for axial shifting of its track center 41. The tread spacing at which the wheels 15 and 16 are shown in Fig. 2 represents the limit of relative approach of the track centers 39 and 41, or in other words, Fig. 2 shows the wheels 15 and 16 in their narrowest tread positions. Figs. 3, 4 and 5 show the wheel 15 adjusted to a wide tread position, and adjustment of the wheel 15 to said position may be effected while the wheel 16 remains in the narrow tread position in which it is shown in Fig. 2. The wheel 16, on the other hand, may be adjusted independently of the wheel 15 from the narrow tread position in which it is shown in Fig. 2 to a wide tread position, not shown, corresponding to that in which the wheel 15 is shown in Fig. 3, and to a plurality of intermediate tread positions. If desired, the wheels 15 and 16 may be adjusted simultaneously so as to increase or decrease the spacing between their track centers in one operation.

Referring to Fig. 2, the wheel 15 comprises a body part, or a radial inner part, in the form of a dished plate metal disk 42, an annular outer part in the form of a rubber tire and rim assembly, and means for operatively mounting the outer wheel part on the inner wheel part in rotatable and axially shiftable relation thereto. The disk 42 is secured to a radial flange of the axle 26 by a circumferential series of studs and nuts 43, holes 44 (Fig. 4) for reception of the studs being grouped around a central aperture 46 of the disk, and a pilot shoulder on the axle 26 is fitted into the aperture 46 for centering the disk on the axle. The periphery of the disk 42 is irregularly shaped, as best shown in Fig. 5, to provide three mounting ears for a set of runners in the form of rollers 47, 48 and 49, and to provide three further mounting ears 51, 52, 53 for abutment webs 54, 56 and 57, respectively. Fig. 8 shows the mounting of the roller 47 on the disk 42. As shown in said figure, a bushing 58 extends obliquely through the disk 42 on an axis which is inclined circumferentially of the disk as indicated by the angle α in Fig. 8, and which is squared radially of the disk as shown in Fig. 9. The bushing 58 is rigidly secured in its oblique position on the disk 42, preferably by welding. Mounted on the bushing 58 is a bolt 59 which, as more clearly shown in Fig. 9, comprises a reduced cylindrical shank portion 61, an enlarged cylindrical shank portion 62 in axial alinement with the reduced shank portion 61, and a hexagonal head 63. The free end of the shank portion 61 is threaded and carries a nut 64, a lock washer 65 being interposed between the nut 64 and the bushing 58. The roller 47 has a central cylindrical bore into which the cylindrical shank portion 62 is loosely fitted but without appreciable radial play. A wrench may be applied to the hexagonal head 63 for holding the bolt 59 against rotation while the nut 64 is tightened up. Such tightening of the nut will jam the roller 47 between the head 63 and the bushing 58, the axial width of the roller being slightly greater than the axial length of the shank portion 62. As a result, the roller 47 will have no lateral play on the disk 42 when the nut 64 is drawn up tight to compress the lock washer 65, and the roller 47 will be restrained from rotating on the shank portion 62 of the bolt 59. However, loosening of the nut 64 releases the roller 47 for free rotation on the bolt 59.

As indicated in Fig. 5, all of the rollers 47, 48 and 49 are mounted on the disk 42 in the same oblique position in which the roller 47 is shown in Fig. 8. Referring to the mounting of the roller 48 which is shown in Fig. 2, a bushing 66 which is a duplicate of the bushing 58 (Fig. 8) is obliquely secured to the disk 42 in the mounting ear for the roller 48 in the same angular relation to the disk as explained hereinbefore in connection with the bushing 58 with reference to Figs. 8 and 9. A bolt 67 which is a duplicate of the bolt 59 is mounted in the bushing 66 and carries the roller 48, the explanations given hereinbefore as to the construction and mode of operation of the roller 47 and bolt 59 being likewise applicable to the construction and mode of operation of the roller 48 and bolt 67. That is, the roller 48, like the roller 47, may be jammed laterally against the adjacent mounting bushing, and it may be released for free rotation on its supporting bolt.

The mounting of the third of the rollers, namely, of the roller 49, is generally similar to that of the other two rollers which has been explained hereinbefore, but as distinguished from the rollers 47 and 48, the roller 49 is adjustable on the disk 42 to radially retracted and protracted positions. Referring to Fig. 11 which shows the adjustable mounting of the roller 49, a bushing 68 which is another duplicate of the bushing 58 (Fig. 8) is obliquely secured to the disk 42 in the mounting ear for the roller 49 in the same angular relation to the disk as explained hereinbefore in connection with the bushing 58 with reference to Figs. 8 and 9. Mounted on the bushing 68 is a cam bolt 69 which comprises a cylindrical shank portion 71 rotatably fitted into the bushing 68, a radially enlarged cylindrical shank portion 72 in off-center alinement with the shank portion 71, and a hexagonal head 73 of the same dimensions as the head 63 of the bolt 59. The shank portion 72 forms an eccentric or cam on the bolt 69, and the head 73 is suitably marked, as indicated in Fig. 5, so that the cam bolt 69 can be readily distinguished from the other bolts 59 and 67 when the wheel is in assembled condition as shown in Fig. 5. The free end of the shank portion 71 is threaded and carries a nut 74, a lock washer 76 being interposed between the nut 74 and the bushing 68. The roller 49 has a central cylindrical bore into which the off-set cylindrical cam portion 72 is loosely fitted but without appreciable radial play. A wrench may be applied to the hexagonal head 73 for rotating the cam bolt 69 within the bushing 68 after the nut 74 has been loosened, and such rotation of the cam bolt will cause displacement of the roller 49 relative to the disk 42 in a direction transversely to the axis of the bushing 68 due to the mentioned off-center relation between the shank portions 71 and 72. The roller 49 may thus readily be adjusted on the disk 42 to radially retracted and protracted positions. After the roller 49 has been adjusted to any desired radial position the nut 74 may be tightened to secure the bolt 69 against rotation within the bushing 68. Such tightening of the nut 74 will jam the roller 49 between the head 73 of the bolt 69 and the bushing 68, the axial width of the roller being slightly greater than the axial length of the shank portion 72. Loosening of the nut 74 will release the roller 49 for rotation on the bolt 69.

Referring to Fig. 2, the roller 47 is indicated in dotted lines on the lower part of the disk 42, and the roller 48 is shown in full lines on the upper part of the disk in the same lateral relation thereto as the roller 47. That is, rotation of the axle 26 within its bearings 27, 28, and consequent rotation of the disk 42 will cause the rollers 47 and 48 to move bodily with the disk in a common radial plane. The third roller 49 which does not appear in Fig. 2 but which is shown in Figs. 1, 3 and 5 is mounted on the disk 42 in the same lateral relation thereto as the rollers 47, 48, and when the disk 42 is rotated all of the rollers will therefore move bodily therewith in said common radial plane.

The annular outer part of the wheel 15 comprises a drop center rim 77 of standard design and a pneumatic tire 78 which is mounted on the rim in conformity with established practice. As best shown in Fig. 2, the rim 77 has a flat and relatively wide drop center portion 79 and two annular bead seat portions 81 and 82 at the opposite sides of the drop center portion 79. At its inner periphery the rim is provided with three parallel, spiral track rails 83, 84 and 86 (Fig. 5) for cooperation with the rollers 47, 48 and 49, respectively, the configuration and relative arrangement of the track rails being best illustrated in Fig. 4 which shows the full length of the track rail 84 and parts of the other two track rails 83 and 86. Each track rail occupies an arc of about 130° and leads transversely of the plane of the rim, that is, transversely of a plane extending parallel to the sides of the rim through the middle of the drop center section 79. The track rails are equally distributed circumferentially of the rim as best shown in Fig. 5, and the disposition of the rails in their lateral relation to each other and to the rim 77 is best illustrated by the developed view shown in Fig. 7. The dash-dotted line 87 in Fig. 5 indicates an imaginary split of the rim, and Fig. 7 shows an inside view of the rim as it would appear if the rim were split open at the line 87 and straightened out into a horizontal plane. The rail 83 which appears in full length in Fig. 7 extends obliquely from one side of the rim to the other across the drop center portion 79 to which it is suitably secured, as by riveting or welding. At its opposite ends the rail 83 projects a short distance beyond the corners of the drop center portion 79 and over the bead seat portions 81 and 82, respectively, of the rim. The extremities of the overhanging end portions of the rail are sharply bent inwardly of the rim to provide end stops 88 and 89 (Fig. 5) for the roller 47 which cooperates with the rail 83. As further shown in Figs. 5 and 9 the overhanging end of the rail 83 adjacent the end stop 88 is braced by a plate metal spacer 91 which is fitted upon the bead seat portion 81 of the rim and which is suitably secured in place, as by welding. A similar spacer, not shown, is provided at the other end of the rail 83 adjacent the end stop 89 for supporting the overhanging portion of the rail at said other end on the bead seat portion 82 of the rim.

The foregoing description of the rail 83 and of its mounting on the rim 77 similarly applies to the other two rails 84 and 86. As shown in Fig. 5, the rail 84 has end stops 92 and 93 for the roller 48, and the rail 86 has end stops 94 and 96 for the roller 49, the end stops 92 and 94 as shown in Fig. 7, overlying the bead seat portion 81 of the rim, and the end stops 93 and 96 overlying the bead seat portion 82 of the rim. A plate metal brace 97 (Fig. 5) corresponding to the plate metal brace 91 (Fig. 9) supports the overhanging end of the rail 84 on the bead seat portion 81 of the rim, and a similar plate metal brace 98 (Fig. 2) supports the overhanging end of the rail 84 on the bead seat portion 82 of the rim. The rail 86 is similarly supported at its overhanging ends on the bead seat portions, respectively, of the rim by a plate metal brace 99 (Fig. 5) and by a plate metal brace 101 (Fig. 2).

Each of the rails 83, 84 and 86 is made of rectangular bar stock the profile of which is best shown in Fig. 9. As further shown in Fig. 9, the roller 47 has a circumferential groove accommodating the rail 83, the groove being of a width slightly larger than the width of the rail 83 so as to enable the roller to straddle the rail without appreciable lateral play. Referring to Fig. 8, the helix angle of the rail 83 is indicated by the reference character $\beta$, and the previously mentioned angle $\alpha$ which determines the oblique position of the roller 47 on the disk 42, is so proportioned that it forms the complement of the helix angle $\beta$. The other rollers 48 and 49 are circumferentially grooved the same as the roller 47, and they cooperate with the rails 84 and 86, respectively, in the same angular relation to the disk 42 as explained hereinbefore in connection with the roller 47 and rail 83.

The rollers 47, 48 and 49 afford three points of support for the disk 42 on the rim 77, and the rim is retained in a plane at right angles to the axis of the axle 26 by cooperation of the flanges of the rollers with the side faces of the rails 83, 84 and 86, respectively. The cam bolt 69, as stated, may be rotated to adjust the roller 49 to radially retracted and protracted positions, and when the roller 49 is adjusted to its extreme radially retracted position while the rollers 47 and 48 are fully seated on their respective rails 83 and 84, as shown in Fig. 5, the bottom surface of the groove in the roller 49 will be spaced a short distance from the radially inner face of the rail 86. However, the roller 49 in its extreme retracted position still straddles the rail 86 so that the rim 77 will be prevented from lateral tilting relative to the disk 42. Adjustment of the roller 49 to its extreme radially retracted position places the roller 49 into relatively loose cooperative engagement with the rail 86. On the other hand, when the roller 49 is moved outwardly toward its radially protracted position by rotation of the cam bolt 69, as explained hereinbefore, the bottom surface of the groove in the roller 49 will first engage the radially inner surface of the rail 86, and by continued outward movement of the roller 49 substantial radial pressure may be brought upon the rim at the contact points of all three rollers with their respecive rails. The throw of the cam bolt 69 is sufficient to cause a slight distortion of the rim from a perfect circle, that is, the cam bolt 69 may be operated to "chord" the rim upon the disk. Outward adjustment of the roller 49 in the described manner places the roller 49 into relatively tight cooperative engagement with the rail 86.

As mentioned hereinbefore, the nuts on the supporting bolts 59, 67 and 69 for the rollers 47, 48 and 49, respectively, may be backed off to release the rollers for free rotation relative to the disk, and when this is done and the roller 49 is adjusted to its maximum retracted position the inner wheel part comprising the disk 42, and the outer wheel part comprising the rim 77 and tire 78 will have a slight amount of radial and axial play relative to each other. Such slight play between the wheel parts is desirable to provide for relative rotation of the wheel parts without undue restraint during the tread adjusting operation, as will be discussed more fully hereinbelow.

Referring again to Fig. 4, a first series of five mounting pads 102 to 106 for a control abutment or block 107 are secured, as by welding, to the rim 77 on a spiral line parallel to and between the rails 83 and 84. Fig. 7 shows the disposition of the pads 102 and 106 relative to each other and to the rim more clearly, the line on which the pads are arranged extending obliquely across the rim in the middle between the rails 83 and 84, and the pads being equally spaced from each other along said line. The pads 103, 104 and 105 are directly secured to the drop center portion 79 of the rim, as by welding, and the end pad 102 is mounted on an angle clip 108 which is secured, as by welding, to the bead seat portion 81 of the rim. As shown in Figs. 4 and 5, the angle clip 108 has an axial leg flush with the drop center portion of the rim and a radial leg fitted upon the bead seat portion at the axially outer side of the rim, and the end pad 102 is secured to the axial leg of the clip 108 in alinement with the pads 103, 104 and 105. The other end pad 106 is secured to an angle clip 109 (Fig. 7) which is shaped and positioned on the bead seat portion 82 of the rim in the same manner as explained in connection with the clip 108.

A second series of mounting pads 111 to 115 for a control abutment or block 116 (Fig. 5) are mounted on the rim 77 between the rails 83 and 86, as best shown in Fig. 7, and the foregoing explanations regarding the mounting of the first series of pads 102 to 106, similarly applies to the mounting of the second series of pads 111 to 115. The end pad 111 of the second series is mounted on an angle clip 117 which, like the angle clip 108, is fitted upon the bead seat portion 81 of the rim and suitably secured in place, as by welding. The other end pad 115 of the second series is similarly mounted on an angle clip 118 which is secured to the bead seat portion 82 of the rim.

A third series of mounting pads 119 to 123 for a control abutment or block 124 (Fig. 5) are mounted on the rim 77 between the rails 84 and 86 as indicated in Fig. 7, and the foregoing explanations regarding the mounting of the first series of pads 102 to 106 similarly applies to the mounting of the third series of pads 119 to 123. The end pad 119 of the third series is mounted on an angle clip 125 which, like the angle clip 108, is fitted upon and secured to the bead seat portion 81 of the rim, and the other end pad 123 of the third series is correspondingly mounted on the bead seat portion 82 of the rim by means of an angle clip 126 (Fig. 7).

Fig. 5 shows the control blocks 107, 116 and 124 positioned at one end of each of the three series of mounting pads, that is, on the mounting pads 106, 115 and 123, respectively, and Fig. 1 shows the same control blocks positioned at the other end of each of the series of mounting pads, that is, Fig. 1 shows the control block 107 positioned on the end pad 102, the control block 116 positioned on the end pad 111, and the control block 124 positioned on the end pad 119. In other words, Fig. 1 shows the positions in which the control blocks are secured on the rim when the wheel 15 is adjusted to its minimum tread position (Fig. 2), and Fig. 5 shows the positions in which the control blocks are secured on the rim when the wheel 15 is adjusted to the wide tread position in which it is shown in Fig. 3. The pad 111 and the control block 116 positioned thereon as shown in Fig. 1 also appear, on an enlarged scale, in Figs. 8 and 10. As shown in these figures, the angle clip 117 to which the pad 111 is secured has an axial leg flush with the drop center portion 79 of the rim and a vertical leg fitted upon the bead seat portion 81 of the rim, the clip being welded along its longitudinal edges to the rim. The pad 111 consists of a straight piece of rectangular steel bar, and a rectangular groove 127 is milled into the pad at the side thereof which faces the clip 117, the groove 127 extending clear from one end of the pad to the other. A tapped hole for the reception of a cap screw 128 is formed at the center of the pad, see Fig. 5. The pad is secured to the clip 117 by welding along its longitudinal bottom edges, and the ends of the longitudinal channel formed by the groove 127 are left open. When the wheel is operated in the wide tread position as shown in Figs. 3 and 5, the tapped hole in the pad 111 is exposed, and it may become clogged up by foreign matter such as mud or dirt. The groove 127 in the pad provides for discharge of the foreign matter when the bolt 128 is screwed into the hole. The foregoing description of the pad 111 similarly applies to each of the other pads, that is, each pad has a screw tapped hole at its center and a mud discharge channel at its bottom side.

The control block 116 as shown in Fig. 1 has a base portion fitted upon the pad 111 and a lug portion projecting from the base portion at one end thereof. As shown in Fig. 10 the base portion of the block 116 is channeled at its under side to match the pad 111 and it has a plain hole for insertion of the bolt 128 therethrough. The block 116 is detachably secured to the pad 111 by the bolt 128, and the channeled portion of the block base closely fits the pad 111 so that the block will be secured against rotary displacement about the bolt 128 after the bolt has been tightened up. The lug portion of the control block is rigidly secured to the base portion as by welding and has a tapped hole 129 (Fig. 10) for the reception of a cap screw 131 (Fig. 8). The disk 42, as mentioned hereinbefore, has three abutment webs 54, 56 and 57, and in the minimum tread position of the wheel 15 as shown in Fig. 1 the abutment web 54 of the disk contacts the lug portion of the control block 116. The cap screw 131, as shown in Fig. 8, extends through a suitable hole in the abutment web 54, and serves to detachably secure the disk 42 to the control block 116 which in turn is detachably secured to the rim 77 by the cap screw 128. The foregoing description of the control block 116 similarly applies to the other two control blocks 107 and 124. In the narrow tread position of the wheel 15 as shown in Fig. 1, the abutment web 56 of the disk 42 contacts the control block 107 and is detachably secured thereto by a cap screw 132 corresponding to the cap screw 131 of the control block 116, and the block 107 is detachably secured to the pad 102 on the rim by a cap screw 133 corresponding to the cap screw 128 of the block 116. The third abutment web 57 of the disk 42 and the control block 124 are connected by a cap screw 134, and the block 124 is secured to the pad 119 by a cap screw 136, in the same manner as explained in connection with the block 116.

From the foregoing explanations it will be seen that the disk 42 and the rim 77 may be locked together for rotation as a unit in opposite directions by securing the control blocks 107, 116 and 124 to the rim by means of the cap screws 133, 128 and 136, respectively, and by securing the disk 42 to the control blocks by means of the cap screws 131, 132 and 134. When so locked together the disk and the rim are rigidly connected with each other at three points spaced 120 degrees apart, and chording of the rim upon the disk by means of the cam bolt 69, as explained hereinbefore, establishes three further load supporting connections between the disk and the rim at the rollers 47, 48 and 49. The rim is thus operatively supported on the disk at six points spaced 60 degrees apart, and the loads to which the disk and the rim become subjected in operation of the tractor will be properly distributed circumferentially of the wheel.

The procedure of adjusting the wheel 15 from the minimum tread position in which it is shown in Figs. 1 and 2 to the wide tread position in which it is shown in Fig. 3 may be carried out as follows without jacking up the tractor. First, the disk 42 is released for rotation relative to the rim by taking out the cap screws 131, 132 and 134; by backing up the nuts on the supporting bolts 59, 67 and 69 for the rollers 47, 48 and 49, respectively, so as to release the rollers for free rotation on their supporting bolts, as has been explained hereinbefore; and by adjusting the roller 49 to its maximum retracted position as has also been explained hereinbefore. An operator may then get up on the seat 12, and while the engine is running and the master clutch is disengaged, he may put the transmission in forward gear and lock the brake for the right rear wheel 16. When the operator then engages the master clutch power from the engine will be transmitted through the differential 20, pinion shaft 32, pinion 31 and gear 29 to the axle shaft 26 and cause rotation of the disk 42 in a forward direction which will be anticlockwise as viewed in Fig. 1. Since the outer wheel part 77, 78 is in contact with the ground and subject to the tractor weight and the right rear wheel is locked, the disk 42 will start to rotate relative to the outer wheel part and carry the rollers 47, 48, 49 with it. The rollers in turn will start to move along their respective rails 83, 84 and 86, and the flanges of the rollers next to the disk 42 will bear laterally against the rails and force the outer wheel part axially outwardly relative to the inner wheel part at three points on the inner periphery of the rim 77 which are spaced 120 degrees apart. While such axial outward movement of the outer wheel part is strongly resisted by the friction between the tire 78 and the ground, the outer and inner wheel parts are subject to severe lateral thrust upon each other, but such thrust is adequately taken up by the disk 42, the rollers 47, 48, 49, the rails 83, 84, 86 and the rim 77, all of which parts are sturdily constructed and amply strong to withstand the heavy thrust loads without undue strain. As the disk 42 continues to rotate in anticlockwise direction relative to the rim 77, the rollers move along the rails 83, 84 and 86, respectively, and guide the outer wheel part axially of the inner wheel part toward the wide tread position in which the outer wheel part is shown in Fig. 3, the plane of the rim being securely retained at substantially right angles to the axis of the axle 26 throughout such axial displacement of the outer wheel part due to the cooperation of the roller flanges with the side surfaces of the rails.

Figs. 4 and 5 show the disk 42 rotated through an angle of approximately 130 degrees from the position in which the disk is shown in Fig. 1, and the outer wheel part is shown in Figs. 4 and 5 in the same axial position relative to the inner wheel part in which it is shown in Fig. 3. It will be noted that the arrangement of the control blocks 107, 116 and 124 as shown in Fig. 5 differs from the arrangement of the control blocks as shown in Fig. 1. The control blocks may be moved to the positions in which they are shown in Fig. 5 while the outer wheel part is in the narrow thread position shown in Figs. 1 and 2, and in doing so an operator may proceed as follows. Starting, for instance, with the block 107, after this block has been detached from the disk 42 and from the pad 102 by taking out the cap screws 132 and 133, the operator takes this block and places it in reversed position as shown in Fig. 5, on the pad 106 which is the last pad of the first series of pads 102 to 106 (Fig. 7). The cap screw 133 is then used to secure the block 107 in its reversed position on the pad 106, a tapped hole for the reception of the bolt being provided in the pad as pointed out hereinbefore. The other two control blocks 116 and 124 are similarly moved to the end pads 115 and 123 of the second and third pad series, respectively, and the cap screws 128 and 126 are inserted to secure the control blocks 116 and 124 in the reversed positions on the pads 115 and 123 in which they are shown in Fig. 5. All of this may be done, as stated, while the outer and inner wheel parts remain in the relative position in which they are shown in Figs. 1 and 2, and the disk 42 is properly designed so that its subsequent rotation relative to the rim in anticlockwise direction as viewed in Fig. 1, will move the abutment webs 54, 56 and 57 thereof into contact with the control blocks 116, 107 and 124, respectively, as shown in Fig. 5. In this connection the following should be noted.

As best shown in Fig. 5, the disk 42 has a radial recess 137 at its periphery between the mounting ear for the roller 49 and the mounting ear 51 for the abutment web 54. Similar recesses 138 and 139 are formed at the periphery of the disk between the mounting ears for the roller 47 and the abutment web 56, and between the mounting ears for the roller 48 and the abutment web 57. In addition to the recesses 137, 138 and 139 the disk has three notches 141, 142 and 143 at its periphery, the notch 141 being arranged about midway between the abutment web 54 and the roller 47, and the other two notches being similarly arranged between the abutment web 56 and the roller 48, and between the abutment web 57 and the roller 49. Fig. 1 shows the control blocks 107, 116 and 124 at the axially outer side of the disk 42, and if the blocks are moved to the end pads 106, 115 and 123, as discussed hereinbefore and as shown in Fig. 5, preparatory to axial outward movement of the outer wheel part, such movement of the blocks will locate them at the axially inner side of the disk 42. The recesses 137, 138 and 139 of the disk 42 afford the necessary clearance which will prevent the control blocks 107, 116 and 124 on the pads 106, 115, and 123, respectively, from striking the disk 42 when the outer wheel part moves axially outwardly relative to the inner wheel part from the position shown in Figs. 1 and 2 to the position shown in Fig. 3 in response to relative rotation of the outer and inner wheel parts. That is, when the outer wheel part moves outwardly relative to the disk 42 and approaches the position shown in Fig. 3, the control block 107 on the pad 106 passes through the space provided by the recess 138, and at the same time the other two control blocks 116 and 124 pass through the spaces provided by the recesses 137 and 139, respectively. The notches 141, 142 and 143 of the disk 42 afford the necessary clearance which will prevent the end stops 89, 93, and 96 of the rails 83, 84 and 86, respectively, from striking the disk 42 during the mentioned outward movement of the outer wheel part to the position shown in Fig. 3. When the outer wheel part approaches said position the end stop 89 passes through the space provided by the notch 141, and at the same time the end stops 93 and 96 pass through the spaces provided by the notches 142 and 143, respectively.

Axial outward movement of the outer wheel part 77, 78 relative to the inner wheel part in response to forward rotation of the disk 42 by engine power stops when the abutment webs 54, 56, 57 of the disk hit the control blocks 116, 107, 124 on the pads 115, 106, 123, respectively. The outer wheel part is then in the position shown in Fig. 3, and in order to prevent the tractor engine from stalling the operator may break the engine torque by disengaging the master clutch. He may then put the transmission in neutral and get off the seat 12. The mentioned engagement of the abutment webs of the disk with the control blocks on the rim which stops the axial outward movement of the outer wheel part relative to the inner wheel part establishes a one-way forward driving connection between the wheel parts. That is, in the wide tread position of the outer wheel part as shown in Fig. 3, the abutment webs of the disk 42 cooperate with the control blocks on the rim to transmit forward driving torque from the disk to the rim, and in order to lock said one-way driving connection the abutment webs are secured to the control blocks by means of the cap screws 131, 132 and 134, as shown in Fig. 5. In other words, by securing the abutment webs to the control blocks, the inner and outer wheel parts are secured against rotary displacement relative to each other. After the outer wheel part has been moved to the wide tread position as shown in Fig. 3, the roller 49 (Fig. 5) is protracted outwardly by rotation of the cam bolt 69 so as to chord the rim upon the disk, and the nut 74 (Fig. 11) on the cam bolt as well as the nuts 64 (Fig. 9) on the supporting bolts 59 and 67 for the rollers 47 and 48 are drawn up to restrain rotation of the rollers relative to the disk 42, as has been explained hereinbefore. As a result, the outer wheel part will be securely retained in its wide tread position on the tractor, and it will be adequately supported on the inner wheel part to withstand the heavy strains to which the wheel may become subjected in operation of the tractor.

When it is desired to move the outer wheel part from the wide tread position in which it is shown in Fig. 3 to the minimum tread position shown in Fig. 2, the control blocks 107, 116 and 124 may be moved to the positions in which they are shown in Fig. 1 while the outer wheel part is in the wide tread position shown in Fig. 3. The subsequent procedure is analogous to that described hereinbefore, and the inner wheel part is rotated by engine power in reverse, that is, in clockwise direction as viewed in Fig. 1, to move the outer wheel part axially inwardly relative to the inner wheel part. Such inward movement of the outer wheel part comes to a stop when the abutment webs 54, 56 and 57 hit the control blocks on the pads 102, 111 and 119. The abutment webs, in this case, cooperate with the control blocks to establish a one-way reverse driving connection between the wheel parts, and said one-way reverse driving connection is subsequently locked by means of the cap screws 131, 132 and 134 to secure the wheel parts against rotary displacement relative to each other.

It will be noted that the outer wheel part surrounds the inner wheel part at a radial spacing from the center of rotation of the inner wheel part, that is, from the axis of the axle 26, which is greater than the vertical distance of said center from the upper end of the adjacent depending side portion of the arched rear axle structure, and that the outer wheel part, when shifted from the position shown in Fig. 3 to the position shown in Fig. 2, moves from an axially adjusted position in overhanging relation to the inner wheel part at the axially outer side thereof to an axially adjusted position in overhanging relation to the inner wheel part at the axially inner side thereof and in axially overlapping relation to the adjacent depending side portion of the rear axle structure.

In connection with the shifting of the outer wheel part from the position shown in Fig. 3 to the position shown in Fig. 2 it has been pointed out hereinbefore that the control blocks 107, 116 and 124 may be secured to the pads 102, 111 and 119 as shown in Fig. 1 while the outer wheel part is in the wide tread position shown in Fig. 3. Referring to Fig. 7, it will be noted that the pads 102, 111 and 119 are arranged peripherally of the rim in a first row at the axially outer end of the rim 77, and that the pads 103, 112, 120 are arranged in a second row on a line which is parallel to the line on which the pads of the first row are located. The pads 121, 104 and 113 are similarly arranged in a third row on a line coinciding with the center of the rim. The pads 122, 105 and 114 are arranged in a fourth row, and the pads 123, 106 and 115 are arranged in a fifth row on lines which are parallel to the lines on which the other three rows of pads are arranged. Instead of mounting the control blocks on the first row of pads 102, 111 and 119, as shown in Fig. 1, they may be mounted on any of the other four rows of pads while the outer wheel part is in the position shown in Fig. 3. By properly positioning the control blocks on the second, third or fourth row of pads axial inward movement of the outer wheel part relative to the inner wheel part from the position shown in Fig. 3 may be stopped in a number of intermediate tread positions of the outer wheel part. In order to stop the outer wheel part in a first intermediate tread position after it has started to move axially inwardly from the wide tread position shown in Fig. 3, the control blocks are secured to the fourth row of pads 122, 105, 114 while the outer wheel part is in the wide tread position shown in Fig. 3. Proper cooperation of the abutment webs of the disk 42 with the control blocks, upon reverse or clockwise rotation of the disk, will be insured by securing each of the control blocks on its respective pad in the row 122, 105, 114 in the position which is illustrated in Fig. 6 for the control block 107. That is, all of the control blocks will be positioned so that their upstanding lug portions face anticlockwise, as distinguished from the showing in Fig. 5 where the control blocks are positioned so that their lug portions face in clockwise direction. Upon clockwise rotation of the disk 42 from the position shown in Fig. 6 the abutment webs of the disk will engage the control blocks and axial inward movement of the outer wheel part will be stopped, after a relatively short inward shift of the outer wheel part from the wide tread position in which it is shown in Fig. 3. Summarily stated, the mentioned positioning of the control blocks on the fourth row of pads 122, 105, 114 determines the first intermediate tread position of the outer wheel part.

The second intermediate tread position of the outer wheel part may be determined by securing the control blocks on the pads 121, 104, 113 (Fig. 7) of the third row in such positions thereon that the lug portions of the blocks face anticlockwise with reference to Fig. 5.

The third intermediate tread position of the outer wheel part may be determined by securing the control blocks on the pads 103, 112 and 120 of the second row (Fig. 7) in such positions thereon that the lug portions of the blocks face anticlockwise with reference to Fig. 5.

When the inner wheel part is rotated reversely, that is clockwise, relative to the outer wheel part, as viewed in Fig. 5, for the purpose of shifting the outer wheel part to any of the mentioned intermediate tread positions, the reversely leading sides of the abutment webs on the disk 42 will contact the control blocks upon arrival of the outer wheel part in the selected tread position, and as a result a one-way reverse driving connection between the wheel parts will be established in any of the intermediate tread positions of the outer wheel part. The abutment webs of the disk 42 may be secured to the control blocks by means of the cap screws 131, 132 and 134 in order to secure the inner and outer wheel parts against rotary displacement relative to each other in any of said intermediate tread positions of the outer wheel part.

The outer wheel part may be moved to any of the mentioned three intermediate tread positions by reverse rotation of the disk 42, as stated, and the lug portions of the control blocks must face anticlockwise, as indicated in Fig. 6, in order to stop the outer wheel part in any of the mentioned three intermediate tread positions. A fourth, a fifth and a sixth intermediate tread position of the outer wheel part may be determined by securing the control blocks to the pads of the second, third or fourth row, in such positions that their lug portions face clockwise, that is, in positions corresponding to a reversal of the block 107 in Fig. 6. Assuming for purposes of explanation that the outer wheel part is in the minimum tread position in which it is shown in Fig. 2, and that the control blocks are secured to the pads 103, 112, 120 of the second row (Fig. 7) in such positions that their lug portions face clockwise, which means in the direction in which the lug portions of the control blocks face in Fig. 5. Upon anticlockwise, that is forward, rotation of the disk 42 from the position in which it is shown in Fig. 2 the forwardly leading sides of the abutment webs of the disk 42 will then engage the control blocks and axial outward movement of the outer wheel part will be stopped after a relatively short outward shift of the outer wheel part from its minimum tread position. Such short outward shift brings the outer wheel part to the mentioned fourth tread position and establishes a one-way forward driving connection between the inner and outer wheel parts. In order to lock said forward one-way driving connection the abutment webs of the disk may be secured to the control blocks by means of the cap screws 131, 132, 134. An analogous procedure may be followed for adjusting the outer wheel part to the mentioned fifth and sixth intermediate tread positions, and for securing the inner and outer wheel parts against rotary displacement relative to each other after the outer wheel part has been shifted to the selected intermediate tread position.

It should be noted that the guide mechanism comprising the rollers 47, 48 and 49 and the spiral rails 83, 84 and 86 is radially spaced a substantial distance from the axle 26, which permits ample proportioning of the guide mechanism commensurate with the heavy duties which it has to perform. The substantial radial spacing of the guide mechanism from the axle 26 has the further advantage that it affords a favorable distribution of the loads to which the wheel becomes subject during the tread adjusting operation. The rails provide relatively large wearing surfaces, and the mechanism is not apt to develop undue looseness due to wear, which would render it inefficient or inoperative in an unduly short time. The inner and outer wheel parts are freely rotatable relative to each other during the tread adjusting operation but the plane of the outer wheel part is securely retained at substantially right angles to the axis of the axle 26 while the outer wheel part is shifted from one tread position to another, and after the inner and outer wheel parts have been locked together all radial and axial play therebetween is eliminated. The adjustable wheel assembly comprising the inner and outer parts can be manufactured at relatively low costs and it lends itself to use with existing types of tractors, that is, it can be used in lieu of a conventional type tractor wheel without necessitating any change, or at least any substantial change, of the rest of the tractor. A further advantageous feature of the tractor described hereinbefore resides in the fact that it is devoid of any laterally projecting axle extensions which would cut down the plant clearance at the axially outer sides of the rear wheels, as when the wheels are adjusted to minimum tread positions. A further advantage resides in the fact that an operator may conveniently preselect any desired tread position by securing the control blocks in the proper positions on the rim before engine power is applied to the inner wheel part for shifting the outer wheel part. There is no possibility for the outer wheel part to overtravel the selected tread position and it is not necessary for the operator to carefully maneuver the outer wheel part into the desired tread position. He simply engages the master clutch and lets the inner wheel part spin until he hears the clash and feels the shock which is caused by the impact of the abutment webs of the disk upon the control blocks, and the operator will then know that the outer wheel part has moved to the desired tread position.

It should further be noted that the abutment webs of the disk, the control blocks and the associated cap screws are operable to establish a driving connection between the inner and outer wheel parts in any selected tread position of the outer wheel part and that the parts affording said driving connection are effective to transmit torque without subjecting said wheel parts to appreciable axial thrust upon each other. This may be explained more fully with reference to Figs. 8 and 10. As shown in these figures, the abutment web 54 comprises a plate member which is placed on edge against the axially outer side of the disk 42 and it is rigidly secured thereto, as by welding. The radial outer part of the plate has a short tongue 144 lying flat against the disk, and bracing webs 140 and 145 (Fig. 5) are placed near the radial inner end of the plate. The web 54 extends transversely of the radial plane of the disk at an angle which, as shown in Fig. 8, is substantially equal to the angle between the plane of the disk and the axis of the roller 47. The control block 116 is secured to the rim in such a position that the web 54 bears squarely against the upstanding lug portion of the control block. When the tractor as shown in Fig. 1 is driven in reverse, the driving torque is transmitted from the abutment web 54 directly to the control block 116, and when the tractor is driven forwardly the driving torque is transmitted from the abutment web 54 to the control block 116 through the cap screw 131. In either case the parts affording the driving connection are effective to transmit the torque without subjecting the inner and outer wheel parts to appreciable axial thrust upon each other. These considerations apply similarly to the other driving connections at the abutment webs 56 and 57, and to any of the axially adjusted positions of the outer wheel part.

It will be seen that the wheel assembly described hereinbefore in connection with Figs. 1 to 11 greatly facilitates and expedites the work of varying the tractor tread, it being understood that the foregoing explanations with respect to the rear wheel 15 at the left side of the tractor similarly apply to the rear wheel 16 at the right side of the tractor. The actuating connection between the inner and outer parts of each wheel, afforded by the rollers and the parallel spiral rails is operable by relative rotation of the wheel parts to move the outer wheel part axially on the inner wheel part within a sufficiently wide range to afford a tread variation such as is usually desired in tricycle type tractors. The inner wheel part and the outer wheel part of each rear wheel may conveniently be released for relative rotation, and the actuating connection between the inner and outer parts of each wheel may subsequently be operated by engine power to adjust the outer wheel part from one tread position to another, and after the outer wheel part of either wheel has been adjusted to any desired tread position, the inner and outer wheel parts may be conveniently locked together for normal operation of the tractor. During the entire procedure of varying the tread spacing of the rear wheels said wheels remain in active vehicle-supporting condition, and the work of jacking up the tractor and of manipulating the wheels or their tire and rim assemblies by hand is entirely eliminated. In this respect the improved wheel assembly disclosed herein not only saves considerable physical effort on the part of the operator but it also eliminates the dangerous conditions which arise, particularly in connection with larger size tractors and heavy wheels, when the tractor must be jacked up and the wheels or the tire and rim assemblies must be detached from the tractor and manipulated by hand in order to vary the tread spacing of said wheels.

It will further be seen that the abutment webs of the disk 42, the control blocks, the mounting pads for the control blocks on the rim, and the cap screws constitute an arrangement for controlling the transmission of torque from one wheel part to the other so as to provide for rotation of one of the wheel parts relative to the other when it is desired to change the tread spacing of the rear wheels of the tractor, and also for rotation of both wheel parts as a unit in forward and reverse directions during normal operation of the tractor after the outer wheel part has been adjusted to any desired tread position. The torque control arrangement permits variation of the range between the end positions to which the outer wheel part may be moved by relative rotation of the wheel parts. For example, when the outer wheel part is in its minimum tread position as shown in Fig. 2, and the control blocks are secured in proper positions on the first row of pads 102, 111, and 119 (Fig. 7), the control blocks determine one end position of the outer wheel part. While the outer wheel part is in said one end position the control blocks may be mounted in proper positions on the second row of pads 103, 112 and 120, and when so mounted the control blocks determine another end position of the outer wheel part. The range between the end positions which are determined by mounting of the control blocks on the first and second rows of pads and to which end positions the outer wheel part may be moved by relative rotation of the wheel parts is relatively short, but it may be increased by mounting the control blocks in proper positions on the third, fourth or fifth row of pads. When all of the control blocks are mounted in proper positions on the first row of pads a circumferential driving connection between the wheel parts will be automatically established upon adjustment of the outer wheel part to its minimum tread position, that is, to one of its end positions. On the other hand, if only one of the control blocks is mounted in proper position on the first row of pads and either or both of the other two control blocks are mounted in proper positions on another row of pads a circumferential driving connection between the wheel parts will be automatically established upon adjustment of the outer wheel part to either of said end positions.

Considering the abutment webs 54, 56 and 57 of the disk 42 and the control blocks 116, 107 and 124 as relatively abuttable driving means, it will be noted that said driving means are operable to automatically establish a forward driving connection between the inner and outer wheel parts upon shifting of the outer wheel part from one axially adjusted position thereof (Fig. 2) to another (Fig. 3), and to automatically establish a reverse driving connection between said wheel parts upon shifting of said outer wheel part from said other (Fig. 3) to said one (Fig. 2) axially adjusted position thereof.

Figs. 12 to 15 are diagrammatic views of a modification of the adjustable wheel assembly described hereinbefore in connection with Figs. 1 to 11. The modified wheel assembly comprises an inner wheel part in the form of a dished disk 146 an annular outer part in the form of a tire and rim assembly, the rim only being shown, and means for operatively mounting the outer wheel part on the inner wheel part in rotatable and axially shiftable relation thereto. The disk 146 is generally similar to the disk 42 and carries three rollers 147, 148 and 149 (Fig. 13) which are spaced 120 degrees apart and are identical in shape with the rollers 47, 48 and 49 which have been described hereinbefore in connection with the disk 42. One of the rollers 147, 148, 149 is supported on a cam bolt similar to the cam bolt 69 in Fig. 11, and the other two rollers are mounted on bolts similar to the bolt 59 in Fig. 9. The supporting bolts for the rollers 147, 148, 149 in turn are mounted on bushings 151, 152, 153 (Fig. 13) which extend obliquely through the disk 146 at the periphery thereof, and which are similar to the bushing 58 shown in Fig. 8, but the bushings 151, 152, 153 are somewhat longer than the bushings on the disk 42, as will be apparent from a comparison of Fig. 13 with Fig. 3. Abutment webs 154, 156 and 157, corresponding to the abutment webs 54, 56 and 57 of the disk 42 are secured to the axially outer side of the disk 146, and additional abutment webs 158, 159 and 161 are secured to the disk 146 at the axially inner side thereof directly opposite, respectively, to the abutment webs 154, 156 and 157.

The inner part of the modified wheel assembly is surrounded by a drop center rim 162 which is similar to the drop center rim 77 but of somewhat larger diameter to afford more clearance at the upper end of the elbow section 18 of the rear axle structure, as shown in Fig. 12. A set of three parallel spiral rails 163, 164, 166 are secured to the rim 162 at the inner periphery thereof substantially in the same manner as the rails 83, 84 and 86 are secured to the rim 77, but the helix angle γ (Fig. 13) of the rails 163, 164, 166 is somewhat smaller than the helix angle β in Fig. 8, and the rails 163, 164, 166 are longer than the rails 83, 84, 86, the opposite ends of the rails lying inside of the lateral confines of the rim as shown in Fig. 13. Mounting pads for a set of three control blocks are secured to the rim in the spaces between the rails as shown in Fig. 13, and the mounting pads and control blocks are designated in Fig. 13 by the same reference characters as in Fig. 7 to indicate that the explanations given hereinbefore with reference to the mounting pads and control blocks of the wheel assembly shown in Figs. 1 to 11 similarly apply to the mounting pads and control blocks of the modified wheel assembly shown in Figs. 12 to 15.

In Fig. 12 the outer wheel part is shown in the same lateral relation to the elbow section 18 of the tractor as in Fig. 2, that is, Fig. 12 shows the outer wheel part in its minimum tread position. The roller 148, as shown in Fig. 12, is mounted at the axially inner side of the disk 146, and as shown in Fig. 13, the roller 148 contacts the rail 164 at the end of the latter adjacent to the axially outer edge of the rim 162. The other rollers 147 and 149 similarly contact the rails 163 and 166, respectively, adjacent to the axially outer edge of the rim 162. The control blocks 107, 124 and 116 are shown in Fig. 13 as being secured to the pads 102, 119 and 111, respectively, and the abutment webs 159, 161 and 158 at the axially inner side of the disk 146 cooperate with the control blocks 107, 124 and 116, respectively, to establish a one-way reverse driving connection between the disk 146 and the rim 162. This one-way driving connection may be locked in the same manner as explained hereinbefore, in order to secure the inner and outer wheel parts against relative rotary displacement when the outer wheel part is in its minimum tread position as shown in Fig. 12.

The procedure of shifting the outer wheel part from the minimum tread position in which it is shown in Fig. 12 to a first wide tread position which is indicated in dotted lines in Figs. 12 and 13, is analogous to the procedure of shifting the outer wheel part shown in Fig. 2 to the wide tread position shown in Fig. 3. That is, the control blocks 107, 124, and 116 are secured in the proper positions on the pads 106, 123 and 115, respectively, preparatory to shifting the outer wheel part axially outwardly relative to the inner wheel part, and upon subsequent application of engine power to the disk 146 the latter is rotated forwardly, as indicated by the arrow A in Fig. 13. Such forward rotation of the disk 146 will bring the abutment webs 158, 161 and 159 into contact with the control blocks on the pads 115, 123 and 106, respectively, and establish a one-way forward driving connection between the wheel parts when the outer wheel part is in its first wide tread position. For normal operation of the tractor said one-way forward driving connection may be locked in the manner explained hereinbefore.

When the outer wheel part is in the mentioned first wide tread position as indicated in dotted lines in Figs. 12 and 13 the roller 147 bears upon the rail 163 at the end of the latter between the pads 106 and 115 in Fig. 13, while the roller 148 bears upon the rail 164 at the end of the latter between the pads 106 and 123 in Fig. 13, and the roller 149 bears upon the rail 166 at the end of the latter which appears at the top of Fig. 13.

Referring to Fig. 15, the last mentioned end of the rail 166 appears at the top of said figure the same as in Fig. 13, and Fig. 15 shows the rim and the disk in full lines in the relative position which they occupy when the outer wheel part is in the mentioned first wide tread position. However, the roller 149 in Fig. 15 is shown on the rail 164 and not on the end of the rail 166 to which end the roller 149 is moved, as stated, during the mentioned adjustment of the outer wheel part from its minimum tread position to the mentioned wide tread position. The transfer of the roller 149 from the rail 166 to the rail 164 may be accomplished, after the outer wheel part has been moved to the first wide tread position, by changing the mounting of the roller 149 on the bushing 153 so as to position the roller at the axially outer end of the bushing 153, that is, at the axially outer side of the disk 146, as shown in Fig. 15 and as distinguished from Fig. 13 where the roller 149 appears at the axially inner side of the disk 146. These explanations similarly apply to the showing of the rollers 147 and 148 in Fig. 15.

In actual practice, the transfer of the rollers 147, 148 and 149 from the rails 163, 164 and 166, respectively, to the rails 166, 163 and 164, respectively, which results in the location of the rollers as shown in Fig. 15, may be accomplished as follows. While the tractor stands on the ground with the outer wheel part adjusted to the mentioned first wide tread position, the weight of the tractor body will be supported on the part of the rim which lies below a horizontal plane through the axle 26, and at least one of the rollers, which may be referred to as the top roller, will carry no vertical load. The supporting bolt for this top roller may therefore be disconnected from the disk 146 while the latter and the rim remain in active load sustaining position and while the rim remains in the same axial position relative to the disk 146 in which it is shown in dotted lines in Fig. 12. After the top roller has been detached from the axially inner side of the disk 146, it may be transferred to the axially outer side of the disk for reinstallation on the bushing from which it has been removed. Such reinstallation of the top roller places it into cooperative engagement with a new rail adjacent to the rail from which the roller has been removed. Fig. 14 illustrates the described transfer of the top roller with reference to the roller 147. It will be noted that the rim 162 as shown in full lines in Fig. 14 occupies the same axial position relative to the disk 146, in which it is shown in dotted lines in Fig. 12, and the full line showing in Fig. 14, therefore, illustrates the mentioned first wide tread position of the outer wheel part. The roller 147 as shown in Fig. 14 is positioned at the axially outer side of the disk 146 and in cooperative engagement with the rail 166. The opposite ends of the bushing 151 in Fig. 14 are equally spaced axially from the rails 166 and 163, and it will be noted by reference to Fig. 13 that the rail 163 is the one on which the roller 147 travels during axial adjustment of the outer wheel part from its minimum tread position to its mentioned first wide tread position. With these considerations in mind it will be apparent that when the roller 147 is the top roller and the outer wheel part is in its first wide tread position, the roller 147 may be transferred from cooperative engagement with the rail 163 into cooperative engagement with the rail 166 by changing its mounting on the bushing 151, and that such transfer may be effected while the disk 146 and the rim 162 remain in active load sustaining position and in the same axial relation to each other in which they are shown in Fig. 14.

The rollers 147, 148 an 149 may be brought successively to a top position by moving the tractor a corresponding distance while the outer wheel part is retained in the mentioned first wide tread position, and each roller may be transferred from one rail to another after it has been brought to a top position by proper movement of the tractor. For instance, after the roller 147 has been installed in cooperative engagement with the rail 166 as shown in Figs. 14 and 15, and while the outer wheel part is in the first wide tread position, the tractor may be driven a proper distance by application of its engine power to bring the roller 148 to a top position, and this roller may then be transferred from cooperative engagement with the rail 164 (Fig. 13) into cooperative engagement with the rail 163 (Fig. 15). Finally, the roller 149 may be brought to a top position by driving the tractor, and the roller 149 may then be transferred from cooperative engagement with the rail 166 (Fig. 13) into cooperative engagement with the rail 164 (Fig. 15).

In Fig. 15 the disk 146 and the rim 162, as stated, are shown in full lines in the position which they occupy relative to each other when the outer wheel part is in its mentioned first wide tread position, and it will be noted that the roller 148, upon transfer from the axially inner to the axially outer side of the disk 146, contacts the rail 163 at a point approximately in the middle between the ends of the rail 163. The rolle: 147 similarly contacts the rail 166 about midway between the ends of said rail, and the roller 149 is correspondingly positioned about midway between the ends of the rail 164.

In connection with the adjustment of the outer wheel part, in Figs. 12 and 13, from its minimum tread position to its first wide tread position it has been mentioned hereinbefore that the control blocks 107, 116 and 124 are secured in proper positions on the pads 106, 115 and 123, respectively, in order to limit axial outward movement of the outer wheel part upon forward rotation of the disk 146 (in the direction of arrow A in Fig. 13) relative to the rim 162. After the rollers 147, 148 and 149 have been transferred to the rails 166, 163 and 164, respectively, as shown in Fig. 15, the control blocks may be removed from the pads 106, 115 and 123 to release the disk 146 for rotation relative to the rim 162 in forward direction as indicated by the arrow A in Fig. 15. Each of the rails 163, 164 and 166 has a pair of end stops corresponding to the end stops of the rails 83, 84 and 86 shown in Fig. 5, the axially inner end stops of the rails 163, 164 and 166 being indicated in Fig. 15 by the reference characters 167, 168 and 169, respectively. When the disk 146 is rotated forwardly after the control blocks have been removed from the pads 106, 115 and 123, the rollers 147, 148 and 149 will move along the rails 166, 163 and 164, respectively, until they hit the end stops 169, 167 and 168, respectively. The mentioned movement of the rollers 147, 148 and 149 along the rails causes axial outward movement of the outer wheel part beyond the mentioned first wide tread position, and such axial outward movement of the outer wheel part comes to a stop when the rollers hit the mentioned end stops on the rails. The outer wheel part then occupies a second wide tread position which is indicated in dotted lines in Figs. 14 and 15.

When the disk 146 is rotated forwardly relative to the rim 162 in order to move the outer wheel part from its first to its second wide tread position, the pads 106, 115 and 123 pass from the axially inner side of the disk to the axially outer side thereof, and the abutment web 157 at the axially outer side of the disk approaches the pad 106, while at the same time the abutment web 156 approaches the pad 115, and the abutment web 154 approaches the pad 123. When the rollers hit the end stops 167, 168, 169 of the rails, the position of the abutment webs 154, 156 and 157 relative to the pads 123, 115 and 106 is such that the control blocks can be secured to these pads, and the webs 154, 156 and 157 can be secured to the control blocks, in order to secure the inner and outer wheel parts against rotary displacement relative to each other.

When it is desired to move the outer wheel part axially inwardly from the second wide tread position which is indicated in dotted lines in Figs. 14 and 15, the disk 146 is first released for rotation relative to the rim 162, and the disk may then be rotated in reverse direction relative to the rim, as indicated by the arrow B in Fig. 15. Such reverse rotation of the disk will cause the outer wheel part to return to the mentioned first wide tread position, but it will be noted from Fig. 15 that axial inward movement of the outer wheel part may be continued beyond said first wide tread position by continued reverse rotation of the disk 146 relative to the rim. The double headed arrow C in Fig. 14 indicates the axial distance through which the outer wheel part may be shifted inwardly beyond the mentioned first wide tread position, and which distance represents the shift which is imparted to the outer wheel part by movement of the rollers 147, 148, 149 from the points on the rails at which they are shown in Fig. 15 to the ends of the rails adjacent to the axially outer edge of the rim. One of the control blocks may be secured to the pad 111 and to the abutment web 156, and the other control blocks may be similarly secured to the pad 119 and abutment web 154, and to the pad 102 and abutment web 157, respectively, for securing the inner and outer wheel parts against rotary displacement relative to each other when the outer wheel part has been shifted inwardly beyond the first mentioned wide tread position through the distance indicated by the double headed arrow C in Fig. 14.

It will be noted that in the modified wheel assembly which has been described hereinbefore in connection with Figs. 12 to 15 the outer wheel part is adjustable axially relative to the inner wheel part between certain limits, and that said limits may be shifted in unison selectively toward one side or the other of the inner wheel part. For example, if the rollers 147, 148 and 149 are mounted on the disk 146 at the axially inner side thereof, as shown in Fig. 13, the outer wheel part may be adjusted axially of the inner wheel part between the limits represented by the full line and dotted line positions, respectively, of the rim in Fig. 12. On the other hand, if the rollers 147, 148 and 149 are mounted on the disk 146 at the axially outer side thereof, as shown in Fig. 15, the outer wheel part may be adjusted axially of the inner wheel part between the limits represented by the dotted line 171 in Fig. 14 and by the dotted line position in which the rim is shown in Fig. 14. Considering a given point on the rim and a radial plane through a given point on the disk, axial displacement of the rim relative to the disk will cause said point to move transversely of said plane through a certain distance when the outer wheel part is moved from one to the other of the limit positions represented, respectively, by the full line and dotted line showings of the rim in Fig. 12, and said point will move transversely of said plane through the same or substantially the same distance when the outer wheel part is moved from one to the other of the limit positions represented, respectively, by the line 171 and by the dotted line showing of the rim in Fig. 14. The transfer of the rollers 147, 148 and 149 from one side of the disk 146 to the other, therefore, does not change the limits between which the outer wheel part may be adjusted relative to the inner wheel part, but it shifts said limits in unison toward one side or the other of the inner wheel part, as will be readily apparent from a comparison of Figs. 12 and 13 with Figs. 14 and 15. The mounting of the rollers 147, 148, 149 at the axially inner side of the disk 146 and in cooperative engagement with the rails 163, 164 and 166, respectively, provides for a first range of axial adjustment of the outer wheel part relative to the inner wheel part, and the mounting of the rollers 147, 148, 149 at the axially outer side of the disk and in cooperative engagement with the rails 166, 163 and 164, respectively, provides for a second range of axial adjustment of the outer wheel part relative to the inner wheel part, and in each range the outer wheel part may be adjusted to either of two end positions, and to any of a plurality of intermediate positions. The rollers 147, 148 and 149 are effective to provide a plurality of circumferentially spaced connections between the inner and outer wheel parts, and by transferring the rollers from one side of the disk to the other in the manner explained hereinbefore said connections may be altered individually and successively while the wheel parts remain in active vehicle-supporting position and while the wheel parts are kept in the same axial relation to each other, in order to selectively dispose the outer wheel part for adjustment within one range or the other.

Figs. 16 to 25 show a second modification of the adjustable wheel assembly described hereinbefore in connection with Figs. 1 to 11. Fig. 17 shows part of the elbow section 18 of the rear axle structure shown in Figs. 2 and 3, and the projecting end of a wheel axle 172 which axle is identical with the axle 26 in Fig. 2, except that the central pilot boss of the axle 172 for the wheel body is somewhat longer than the corresponding pilot boss of the axle 26. Rigidly secured to the axle 172 by studs and nuts 173 is a disk-shaped casting 174 which constitutes the inner or body part of the wheel and which has five radial ears 176 to 180 at its outer periphery, as shown in Fig. 16. An enlarged view of the ear 176 and of the parts mounted thereon is shown in Fig. 18, and Fig. 19 shows the ear 176 and parts mounted thereon in section. The axially opposite sides of the ear 176 are spot-faced to provide a machined radial surface 181 at the axially outer side of the ear and another machined radial surface 182 at the axially inner side of the wheel. The periphery of the disk 174 has a crown which is suitably recessed at the axially inner side of the disk as indicated at 183 in Fig. 18 to facilitate the spot-facing of the axially inner side of the ear 176. The same explanations apply to the other ears 177 to 180.

Referring further to Figs. 18 and 19, a bolt 184 is eccentrically mounted in a bushing 186 which in turn is rotatably fitted into an axial throughbore of the ear 176, the bushing having a hexagonal head at the axially outer side of the ear 176 so that it can be turned within the ear by means of a wrench. The bolt 184 carries a runner 187 which has a flat surface abutting the spot face 182 and a deeply countersunk throughbore 188 accommodating the shank of bolt 184. The runner further has an enlarged head, and a groove 189 is formed in the runner head above the bore 188, the groove, as shown in Fig. 20, extending obliquely to the axis of the bore 188. The runner head further has a thrust surface 191 (Fig. 20) at one end thereof extending at substantially right angles to the axis of the groove 189, and a similar thrust surface 192 at the other end of the runner head extends substantially parallel to the thrust surface 191. A side portion of the runner head between the thrust surfaces 191, 192 extends laterally a short distance over the top surface of the ear 176, and another portion of the runner head at the opposite side thereof projects over the head of the bolt 184. As best shown in Fig. 25, the head of the bolt 184 has a flat 193 facing the overlying side portion of the runner head, and rotation of the bolt 184 relative to the runner 187 is limited by cooperation of the flat 193 with the bottom surface of the overlying side portion of the runner head.

The bolt 184, the bushing 186 and the runner 187 are retained in assembled position on the ear 176 as shown in Figs. 18, 19 and 20 by a nut 194 on the bolt 184, the hexagonal head of the bushing 186 bearing axially upon the spot face 181 of the ear 176 and the runner 187 bearing laterally upon the spot face 182 of the ear 176 when the nut 194 on the bolt 184 is tightened to draw the head of the bolt upon the runner 187. The bolt 184, as stated, is mounted eccentrically in the bushing 186, and when the axial pressure of the head of the bushing upon the spot face 181 of the ear 179 is eased up by backing off the nut 194 on the bolt 184, the bushing 186 may be rotatably adjusted on the ear 176. The bore 188 of the runner 187 is deeply countersunk as stated, and the smallest diameter of the bore is slightly larger than shank diameter of the bolt 184. As a result, when the nut 194 is backed off a few turns on the bolt 184 the runner 187 will be universally movable on the bolt 184. However, the runner 187 has very little radial play relative to the bolt 184 when the nut 194 is backed off to loosen the runner 187, and when the bushing 186 is rotated in the ear 176 from the position in which it is shown in Fig. 19, such rotation of the bushing will cause the bolt 184 and the runner 187 to move relative to the wheel body 174 towards a radially retracted position. During such retracting movement of the runner the laterally projecting portion of its head above the ear 176 will approach the flat top surface of the ear, and the runner will come to rest on said top surface of the ear 176 before the bushing 186 has been rotated through a full 180 degrees from the position in which it is shown in Figs. 18 and 19. In other words, the bolt 184 and the runner 187 may be moved from a radially protracted to a radially retracted position on the wheel body 174 by rotary adjustment of the bushing 186 in the ear 176, but the bushing cannot be rotated through a full revolution, which is a desirable feature as will appear more fully hereinbelow.

Additional runners 196 to 199 which are duplicates of the runner 187, are mounted on the ears 180, 179, 178 and 177. respectively, and the foregoing explanations with reference to the mounting of the runner 187 on the ear 176 similarly apply to the mounting of the other runners on their respective ears.

The wheel body 174 is surrounded by a drop center rim 201 which has a drop center portion 202 and annular bead seat portions 203 and 204 at the opposite sides, respectively of the drop center portion 202. A filler ring 206 which is rolled from angle iron stock is secured to the bead seat portion 203 at the inner periphery of the rim, the ring having a radial flange laterally seated upon the rim and secured thereto, as by welding, and an axial flange flush with the drop center portion 202 of the rim. Another filler ring 207 which is a duplicate of the filler ring 206 is similarly secured to the bead seat portion 204 of the rim. A spiral guide rail 208 for the runner 187 is secured to the rim 201 at the inner periphery thereof and leads transversely of the plane of the rim from a point adjacent to the axially outer edge of the rim to a point adjacent to the axially inner edge of the rim, through an arc of approximately 150 degrees. Fig. 21 shows a development of the rail 208 and of the part of the rim to which it is secured. As shown in Fig. 21, the rail 208 extends obliquely across the drop center portion 202 of the rim, and the opposite end portions of the rail extend obliquely over the filler rings 206 and 207. To secure the rail 208 in position on the rim it is riveted or welded to the drop center portion 202 and to the filler rings 206, 207. At the end of the rail adjacent to the axially outer side of the rim a short bar 209 of the same height as the rail 208 is secured to the filler ring 206 and to the drop center portion of the rim, in position to extend at right angles to the plane of the rim, the bar 209 forming an end stop on the rail 208 for the runner 187. Another short bar 211 corresponding to the bar 209 is similarly secured to the drop center portion 202 of the rim and to the filler ring 207 at the other end of the rail 208, the bar 211 forming another end stop for the runner 187 on the rail 208. A series of equally spaced holes 212 to 222 are drilled into the rail 208 to extend clear from one side thereof to the other, the purpose of the holes being to provide stop stations on the rail as will be more fully explained hereinbelow.

Additional spiral guide rails 223 to 226 for the runners 196 to 199, respectively, are secured to the inner periphery of the rim 201 in the same manner as has been explained hereinbefore in connection with the rail 208. Each of the additional rails is of the same height and length as the rail 208, and leads transversely of the plane of the rim at the same helix angle as the rail 208 through an arc of approximately 150 degrees. The end portions of all the rails adjacent to the axially outer edge of the rim are equally spaced from each other circumferentially of the rim, and end stops 209 are formed at said end portions of the rails 223 to 226, respectively, as indicated in Fig. 16, each of said end stops consisting of a short axial bar like the end stop 209 of the rail 208, and all of the end stops 209 are secured to the filler ring 206 and to the drop center portion 202 of the rim. Figs. 17 and 21 show an end stop 211 at the end of the rail 208 adjacent to the axially inner edge of the rim 201, which end stop, like the end stop 209 of the rail 208 consists of a short axial bar. Corresponding end stops are provided at the axially inner ends of the rails 223 to 226. The transverse holes 212 to 222 are provided in the rail 208 only.

The runner 187 straddles the rail 208 as best shown in Fig. 19, and the runners 196 to 199 similarly straddle the rails 223 to 226, respectively. Each runner may be loosened by first backing off the nut on its supporting bolt and by then turning the bushing for the supporting bolt so as to move the runner to a radially retracted position on the wheel body 174. Retracting movement of the runners is limited, as stated, by contact thereof with the top surfaces of their respective mounting ears, and the operator will therefore be able to adjust the runners to their radially retracted positions quickly and without experimentation. After the runners have all been loosened and retracted in this manner they still straddle their respective guide rails, and while the rim 201 and the wheel body 174 will have a slight amount of axial and radial play relative to each other, cooperation of the runners with their respective supporting bolts, mounting ears and guide rails, will prevent appreciable lateral tilting of the rim relative to the wheel body. In this condition of the wheel assembly the rim 201 may be shifted axially back and forth on the wheel body by relative rotation of the wheel body and rim in the manner described hereinbefore in connection with Figs. 1 to 11, it being understood that the modified wheel assembly shown in Figs. 16 to 25 may be mounted on the tractor shown in Fig. 1 in lieu of the wheel assembly 15 shown in Fig. 2, and that a pneumatic tire corresponding to the tire 78 in Fig. 2, will be mounted on the rim 201 of the modified wheel assembly.

The position in which the rim 201 is shown in Figs. 16 and 17 relative to the wheel body 174 indicates the minimum tread position of the outer wheel part, and in that position the runners 187, 196, 197, 198 and 199 abut the end stops 209 of the rails 208, 223, 224, 225 and 226, respectively, adjacent to the axially outer edge of the rim to establish a one-way reverse driving connection between the inner and outer wheel parts. If it is desired to operate the tractor with the outer wheel part adjusted to its minimum tread position the bushings for the supporting bolts of all runners are first turned to move the runners to radially protracted positions so that the rim will be chorded upon the wheel body. As a result, all radial play between the wheel body and the rim will be eliminated. Next, the nuts on the supporting bolts of all runners are tightened up, and as a result each of the runners will be urged into lateral clamping engagement with its respective rail. This is illustrated for the runner 187 in Fig. 20 and may be more fully explained as follows.

The groove 189 in the runner 187 as shown in Fig. 20, is somewhat wider than the rail 208, and its parallel sides are disposed at such a slant with respect to the surface of the runner which bears against the spot face 182, that when the parts are positioned as shown in Fig. 20, the runner 187 contacts the rail 208 at diametrically opposed edge portions 227 and 228 of the groove 189, one side surface of the groove 189 extending obliquely of the rail 208 at the axially inner side of the latter, and the other side surface of the groove extending obliquely of the rail 208 at the axially outer side of the latter. The shank diameter of the bolt 184 is somewhat smaller, as stated, than the smallest diameter of the countersunk hole 188 of the runner 187 to provide for universal movement of the runner relative to the bolt when the nut 194 on the bolt is backed off a few turns. The angle at which the groove 189 extends relative to the side portion of the runner 187 which bears against the spot face 182, and the width of the groove 189, are so proportioned that when the nut 194 on the bolt 184 is drawn up tight and the parts are positioned as shown in Figs. 19 and 20, the runner firmly bears against the axially inner and outer sides of the rail 208 at the diametrically opposed edge portions 227, 228, respectively, of the groove 189. In addition to the foregoing it will be noted that upon adjustment of the bolt 184 to radially protracted and retracted positions, respectively, the runner 187 is operative to tighten and loosen the rim radially on the inner wheel part. By means of the nut 194, the head of the bolt 184, and the cooperating surfaces of the runner 187 and the ear 176 the runner may be skewed relative to the bolt 184, that is, relative to an axis which extends transversely of the plane of the rim 201, so as to force the runner into lateral engagement with the rail 208 and thereby tighten and loosen the rim laterally on the wheel body 174.

The foregoing explanations similarly apply to the other runners 196 to 199 which are associated, respectively, with the rails 223 to 226. Any one of these rails, like the rail 208, provides spiral guide means which lead transversely of the plane of the rim 201, and any one of the runners 196 to 199, like the runner 187, provides a complementary guide element which is skewable about an axis extending transversely of said plane. The connecting means between any complementary guide element and the body part 174 of the wheel are operable to mount the complementary guide element on said body part in relatively loose cooperative engagement with its associated spiral guide means and to skew the guide element into lateral relatively tight cooperative engagement with its associated spiral guide means.

In the minimum tread position of the outer wheel part, as shown in Figs. 16 and 17, the runners cooperate, as stated, with the end stops 209 of the rails adjacent to the axially outer edge of the rim to establish a one-way reverse driving connection between the wheel body 174 and the rim 201. In order to positively lock said one-way reverse driving connection, a U-shaped control abutment or clip 229 is installed on the rail 208 in close proximity to the runner 187, as shown in Fig. 16, and as also shown more clearly in Figs. 18 and 20. The control clip 229 is retained on the rail 208 in the position shown in Figs. 16, 18 and 20, by a pin 231 which is passed through the hole 222 (Fig. 21) of the rail and through alined holes in the legs of the clip. Cotter pins may be passed through holes 232 and 233 at the opposite ends of the pin 231 in order to hold it in position. The control clip 229 is so proportioned that the pin 231 may be installed in the hole 222 of the rail 208 when the clip is moved along the rail into contact with the thrust surface 191 of the runner 187 while the axially inner edge of the other thrust surface 192 of the runner contacts the end stop 209 of the rail 208, as shown in Fig. 20. The one-way reverse driving connection between the inner and outer wheel parts, which is afforded by contact of the runners with the end stops 209 will therefore be locked upon installation of the control clip 229 on the rail 208 at the hole 222, as shown in Fig. 20, and the wheel parts will be secured against rotary displacement relative to each other.

When it is desired to move the outer wheel part from the minimum tread position indicated in Fig. 17 to a wider tread position, the control clip 229 is removed from its position at the hole 222 of the rail 208, and the inner wheel part is released for rotation relative to the outer wheel part by loosening the runners 187, 196 to 199 in the manner described hereinabove. Engine power may then be applied to the inner wheel part so as to rotate it in forward direction relative to the outer wheel part, and in response to such forward rotation of the inner wheel part the outer wheel part will be subjected to translatory movement axially in outward direction due to cooperation of the runners with the spiral guide rails. The end stop 211 (Fig. 21) of the rail 208, and the corresponding end stops at the axially inner ends of the other rails determine a wide tread limit position of the outer wheel part; while the end stop 209 of the rail 208 and the corresponding end stops at the axially outer ends of the other rails determine a narrow tread limit position of the outer wheel part. From the foregoing explanations it will be apparent that the outer wheel part may be moved from the narrow to the wide tread limit position by forward rotation of the inner wheel part relative to the outer wheel part, and that a one-way forward driving connection between the wheel parts will be automatically established when the outer wheel part arrives in the mentioned wide tread limit position, the runner 187 being brought into driving engagement with the end stop 211 of the rail 208, and the other runners being simultaneously brought into driving engagement with the corresponding end stops of their respective rails. If it is desired to operate the tractor with the outer wheel part adjusted to the wide tread limit position, the runners are tightened up in the manner explained hereinbefore and the control clip 229 is installed on the rail 208 at the hole 212 thereof (Fig. 21) in order to lock the mentioned one-way forward driving connection and to secure the wheel parts against rotary displacement relative to each other.

Figs. 21 and 22 show the runner 187 in an intermediate position on the rail 208 between the end stops 209 and 211, said intermediate position of the runner corresponding to an intermediate tread position of the outer wheel part between the mentioned narrow and wide tread limit positions. Assuming that it is desired to adjust the outer wheel part from its narrow tread limit position to the intermediate tread position indicated in Fig. 21. In that case the control abutment or clip 229, after it has been removed from its position on the rail 208 at the hole 222 (Fig. 21), is installed on the rail 208 at the hole 219, while the outer wheel part is in the mentioned narrow tread limit position. Subsequent forward rotation of the wheel body relative to the rim will then bring the thrust surface 191 of the runner 187 into driving engagement with the control clip 229, and as a result, a one-way forward driving connection between the wheel parts will be automatically established when the outer wheel part arrives in the mentioned intermediate tread position. In order to lock said one-way forward driving connection a second control abutment or clip 234, which is a duplicate of the control clip 229, is installed on the rail 208 at the hole 220 in abutting relation to the thrust surface 192 (Fig. 20) of the runner 187. When so installed the clip 234 is cooperative with the thrust surface 192 of the runner 187 to establish a one-way reverse driving connection between the inner and outer wheel parts. The relative spacing of the holes 212 to 222 of the rail 208, and the proportioning of the control clips 229, 234, and of the runner 187 are such that there will be very little, if any, clearance between the thrust surfaces 191, 192 of the runner and the adjacent control clips when the parts are positioned as shown in Fig. 21.

Assuming, on the other hand, that it is desired to adjust the outer wheel part from its wide tread limit position to the intermediate tread position indicated in Fig. 21. In that case the control clip 229, after it has been removed from its position on the rail 208 at the hole 212 (Fig. 21) is installed on the rail 208 at the hole 220 while the outer wheel part is in the mentioned wide tread limit position. Subsequent reverse rotation of the wheel body relative to the rim will then bring the thrust surface 192 of the runner 187 into driving engagement with the control clip 229 and, as a result, a one-way reverse driving connection between the wheel parts will be automatically established when the outer wheel part arrives in the mentioned intermediate tread position. In order to lock said one-way reverse driving connection, the control clip 234 is installed on the rail 208 at the hole 219 thereof in abutting relation to the thrust surface 191 (Fig. 20) of the runner 187.

Instead of mounting the control clips 229, 234 at the holes 219 and 220 of the rail 208, they may be mounted in the manner explained hereinbefore at any other pair of relatively adjacent holes of the hole series 212 to 222, for the purpose of adjusting the outer wheel part to ten different intermediate tread positions, any one of which may be preselected by installing one of the control clips in the desired position on the rail 208 preparatory to axial adjustment of the outer wheel part.

The end stops 209 and 211 determine operative axially adjusted limit positions of the inner and outer wheel parts relative to each other. The runner 187 provides abutment means which are cooperative, in one of said limit positions, with one of said end stops, and in the other of said limit positions with the other of said end stops, to establish oppositely effective one-way driving connections between said wheel parts upon rotation of the inner wheel part in opposite directions relative to the outer wheel part. The clip 229 provides a control member cooperable with the abutment means 187; and connecting means including the mounting pin 231 for the clip 229 are provided to position the control member 229 on the outer wheel part in cooperative engagement with said abutment means 187 to secure the inner and outer wheel parts in either of said limit positions and to determine an operative axially adjusted position of said wheel parts intermediate said limit positions. The control clip 234 and its associated mounting pin provide releasable locking means for securing the inner and outer wheel parts in said intermediate operative position thereof.

It will further be noted that the control abutments 229 and 234 are cooperative, respectively, with the oppositely facing thrust surfaces 191 and 192 (Fig. 20) of the runner 187 to establish a forward and reverse driving connection between the inner and outer wheel parts in different positions of axial adjustment of the outer wheel part relative to the inner wheel part.

Fig. 24 shows the runner 187 mounted at the axially outer side of the wheel body 174, as distinguished from Fig. 19 where it is shown at the axially inner side of the wheel body. It will be noted that the same procedure of loosening and tightening the runner with respect to the wheel body and rim may be followed irrespective of whether the runner is mounted on the wheel body at the axially inner or at the axially outer side thereof. When all of the runners are mounted at the axially outer side of the wheel body their cooperation with the spiral guide rails of the rim is the same as when the runners are mounted at the axially inner side of the wheel body. However, the wide and narrow tread limit positions to which the outer wheel part may be moved with the runners mounted at the axially outer side of the wheel body, will be displaced outwardly relative to the tractor from the wide and narrow tread limit positions to which the outer wheel part may be moved with the runners mounted at the axially inner side of the wheel body. A similar effect may be obtained by reversing the position of the wheel body 174 on the axle 172.

The wheel assembly described hereinbefore in connection with Figs. 16 to 25, like the other wheel assemblies which have been described hereinbefore in connection with Figs. 1 to 11 and in connection with Fig. 12 to Fig. 15, can be used in lieu of a conventional type tractor wheel without necessitating any change, or at least any substantial change of the rest of the tractor. In each of the wheel assemblies as shown in the accompanying drawings, the outer wheel part is provided with spiral guide means which lead from a radial plane adjacent to one side of the outer wheel part to a radial plane adjacent to the other side of said outer wheel part, and the inner wheel part, in each instance, is provided with complementary guide means which are of shorter axial length than the relative spacing of said planes. Thus, in the wheel assembly described in connection with Figs. 1 to 11, and in connection with Figs. 12 to 15 the spiral guide means provided by the rails 83, 84 and 86, and by the rails 163, 164 and 166, respectively, lead transversely from a radial plane in close proximity to the inner edge of the rim 79 to a radial plane in close proximity to the outer edge of said rim, and the complementary guide means provided by the rollers 47, 48 and 49, and by the rollers 147, 148 and 149, respectively, are of shorter axial length than the relative spacing between said planes. The same relation exists with respect to the spiral guide means provided by the rails 208 and 223 to 226 in Figs. 16 and 17 and the complementary guide means provided by the runners 187 and 196 to 199.

It should be understood that it is not intended to limit the invention to the exact details of construction herein described with reference to the drawings, for various modifications within the scope of the appended claims may occur to persons skilled in the art.

It is claimed and desired to secure by Letters Patent:

1. In a wheel-supported vehicle having a body structure and a supporting wheel therefor mounted on an axle carried by said body structure, the combination of a rotatable element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, and torque transmitting means comprising a first section connected with one of said wheel parts in axially fixed relation thereto and a complementary second section adjustably connected with the other wheel part and cooperative with said first section to establish a driving connection between said wheel parts in any selected position of axial adjustment of said outer wheel part relative to said inner wheel part, and effective to transmit torque without subjecting said wheel parts to appreciable axial thrust upon each other.

2. In a wheel-supported vehicle having a body structure and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, and torque transmitting means comprising a first section connected with one of said wheel parts in axially fixed relation thereto and a complementary second section connectable with the other wheel part alternatively at axially spaced portions of said other wheel part, and cooperative with said first section to establish a driving connection between said wheel parts and effective to transmit torque without subjecting said wheel parts to appreciable axial thrust upon each other.

3. In a wheel-supported vehicle having a body structure, and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, one of said wheel parts having a pair of thrust surfaces formed thereon facing, respectively, in circumferentially opposite directions, and a pair of control abutments adjustably connected with the other of said wheel parts and cooperative with said thrust surfaces, respectively, to establish a forward and reverse driving connection between said wheel parts in different positions of axial adjustment of said outer wheel part relative to said inner wheel part.

4. In a wheel-supported vehicle having a body structure and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, an abutment associated with one of said wheel parts in circumferentially and axially fixed relation thereto and facing circumferentially thereof, a control member adjustably connected with the other of said wheel parts and cooperative with said abutment to establish a one-way driving connection between said wheel parts in different positions of axial adjustment of said outer wheel part relative to said inner wheel part, and releasable locking means operable to secure said wheel parts against substantial rotary displacement relative to each other upon establishment of said one-way driving connection.

5. In a wheel-supported vehicle having a body structure and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, an abutment associated with one of said wheel parts in circumferentially and axially fixed relation thereto and facing circumferentially thereof, a control member, connecting means operable to secure said control member on the other of said wheel parts in different positions of circumferential and axial adjustment relative thereto, said abutment and said control member being cooperative to establish a one-way driving connection between said wheel parts in different positions of axial adjustment of said outer wheel part relative to said inner wheel part, and releasable locking means operable to secure said wheel parts against substantial rotary displacement relative to each other upon establishment of said one-way driving connection.

6. In a wheel-supported vehicle having a body structure and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, an abutment associated with one of said wheel parts in circumferentially and axially fixed relation thereto and facing circumferentially thereof, a control member, connecting means operable to secure said control member on the other of said wheel parts in different positions of circumferential and axial adjustment relative thereto, said abutment and said control member being cooperative to establish a one-way driving connection between said wheel parts in different positions of axial adjustment of said outer wheel part relative to said inner wheel part, and releasable connecting means between said one wheel part and said control member operable to secure said one wheel part to said control member upon establishment of said one-way driving connection.

7. In a wheel-supported vehicle having a body structure and a supporting wheel therefor mounted on an axle carried by said body structure, the combination of a rotatable element mounted in axially fixed position on said axle and forming a radial inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, one of said wheel parts having first and second thrust surfaces formed thereon facing, respectively, in circumferentially opposite directions, a control abutment adjustably connected with the other of said wheel parts and cooperative with said first thrust surface to establish a one-way forward driving connection between said wheel parts in different positions of axial adjustment of said outer wheel part relative to said inner wheel part, and another control abutment independent of said first mentioned control abutment adjustably connected with said other wheel part and cooperative with said second thrust surface to establish a one-way reverse driving connection between said wheel parts in any of said axially adjusted positions of said outer wheel part.

8. In a wheel-supported motor vehicle having a body structure and a supporting wheel therefor mounted on an axle carried by said body structure, the combination of a rotatable power driven element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, relatively spaced stop members associated with one of said wheel parts and determining operative axially adjusted limit positions of said wheel parts relative to each other, abutment means associated with the other of said wheel parts and cooperative, in one of said limit positions, with one of said stop members, and in the other of said limit positions with the other of said stop members, to establish oppositely effective one-way driving connections between said wheel parts upon rotation of said inner wheel part in opposite directions relative to said outer wheel part, and control means operable to secure said wheel parts in one of said limit positions and to release said wheel parts for adjustment from said one to the other limit position.

9. In a wheel-supported motor vehicle having a body structure and a supporting wheel therefor mounted on an axle carried by said body structure, the combination of a rotatable power driven element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially relative to said inner wheel part, relatively spaced stop members associated with one of said wheel parts and determining operative axially adjusted limit positions of said wheel parts relative to each other, abutment means associated with the other of said wheel parts and cooperative, in one of said limit positions, with one of said stop members, and in the other of said limit positions with the other of said stop members, to establish oppositely effective one-way driving connections between said wheel parts upon rotation of said inner wheel part in opposite directions relative to said outer wheel part, and a control member adjustably connected with said one wheel part and cooperative with said other wheel part to secure said wheel parts in either of said limit positions thereof.

10. In a wheel-supported motor vehicle having a body structure and a supporting wheel therefor mounted on an axle carried by said body structure, the combination of a rotatable power driven element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially in opposite directions relative to said inner wheel part, relatively spaced stop members associated with one of said wheel parts and determining operative axially adjusted limit positions of said wheel parts relative to each other, abutment means associated with the other of said wheel parts and cooperative, in one of said limit positions, with one of said stop members, and in the other of said limit positions with the other of said stop members, to establish oppositely effective one-way driving connections between said wheel parts upon rotation of said inner wheel part in opposite directions relative to said outer wheel part, a control member cooperable with said abutment means, and connecting means between said control member and said one wheel part, operable to position said control member on said one wheel part in cooperative engagement with said abutment means to secure said wheel parts in either of said limit positions thereof.

11. In a wheel-supported motor vehicle having a body structure and a supporting wheel therefor mounted on an axle carried by said body structure, the combination of a rotatable power driven element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially in opposite directions relative to said inner wheel part, relatively spaced stop members associated with one of said wheel parts and determining operative axially adjusted limit positions of said wheel parts relative to each other, abutment means associated with the other of said wheel parts and cooperative, in one of said limit positions, with one of said stop members, and in the other of said limit positions with the other of said stop members, to establish oppositely effective one-way driving connections between said wheel parts upon rotation of said inner wheel part in opposite directions relative to said outer wheel part, and control means operable to secure said wheel parts in either of said limit positions and in an operative position of relative axial adjustment intermediate said limit positions.

12. In a wheel-supported motor vehicle having a body structure and a supporting wheel therefor mounted on an axle carried by said body structure, the combination of a rotatable power driven element mounted in axially fixed position on said axle and forming an inner part of said supporting wheel, an annular element forming an outer part of said wheel, and means for operatively mounting said outer wheel part on said inner wheel part in rotatable and axially shiftable relation thereto, said means comprising shift means associated with said inner and outer wheel parts and operable by relative rotation of said wheel parts to move said outer wheel part axially in opposite directions relative to said inner wheel part, relatively spaced stop members associated with one of said wheel parts and determining operative axially adjusted limit positions of said wheel parts relative to each other, abutment means associated with the other of said wheel parts and cooperative, in one of said limit positions, with one of said stop members, and in the other of said limit positions with the other of said stop members, to establish oppositely effective one-way driving connections between said wheel parts upon rotation of said inner wheel part in opposite directions relative to said outer wheel part, a control member cooperable with said abutment means, connecting means between said control member and said one wheel part, operable to position said control member on said one wheel part in cooperative engagement with said abutment means to secure said wheel parts in either of said limit positions and to determine an operative axially adjusted position of said wheel parts intermediate said limit positions, and releasable locking means for securing said wheel parts in said intermediate operative position thereof.

13. In a wheel-supported vehicle having a body structure and a supporting wheel therefor mounted on an axle carried by said body structure, the combination of a rotatable element forming a radial inner part of said supporting wheel and mounted in axially fixed position on said axle, another element forming an annular outer part of said supporting wheel and provided with a spiral track leading from a radial plane adjacent to one side of said outer wheel part to a radial plane adjacent to the other side thereof, means associated with said inner wheel part and in cooperative engagement with said track for securing said wheel parts against lateral tilting relative to each other, said means occupying part of the space between said radial planes and being movable along said track upon relative rotation of said wheel parts to thereby cause adjustment of said outer wheel part to different positions laterally of said body structure, and releasable locking means operable to connect said outer wheel part, in any of said lateral positions thereof, with said inner wheel part for rotation in unison therewith.

14. In a vehicle wheel, a body part, a rim part, and means for operatively mounting said rim part on said body part in rotatable and axially shiftable relation thereto, said means comprising spiral guide means associated with said rim part and leading transversely of the plane of said rim part, complementary guide means of substantially shorter effective length than said spiral guide means, operatively interposed between said body part and said spiral guide means and movable along said spiral guide means upon relative rotation of said body and rim parts to thereby cause adjustment of said rim part to different positions laterally of said body part, and releasable locking means operable to secure said rim part in any of said adjusted positions thereof.

15. In a vehicle wheel, a body part, a rim part, and means for operatively mounting said rim part on said body part in rotatable and axially shiftable relation thereto, said means comprising spiral guide means associated with said rim part and leading transversely of the plane thereof, a pair of stop members associated with said spiral guide means and determining operative axially adjusted limit positions of said rim part relative to said body part, complementary guide means associated with said body part in cooperative engagement with said spiral guide means and movable therealong upon rotation of said body part relative to said rim part in opposite directions to thereby cause adjustment of said rim part to said axially adjusted limit positions, said complementary guide means abutting one of said stop members, in one of said limit positions, and the other of said stop members in the other of said limit positions, to establish oppositely effective one-way driving connections between said body and rim parts, and releasable locking means operable to secure said rim part in either of said limit positions.

16. In a vehicle wheel, an inner wheel part, an outer wheel part surrounding said inner wheel part, and means for operatively mounting said outer wheel part on said inner wheel part in rotatable and axially shiftable relation thereto, said means comprising spiral guide means associated with one of said wheel parts and leading transversely of the plane thereof, a complementary guide element, and adjustable connecting means between said complementary guide element and the other of said wheel parts, operable to position said guide element selectively in relatively loose and relatively tight cooperative engagement with said spiral guide means.

17. In a vehicle wheel, a body part, a rim part, and means for operatively mounting said rim part on said body part in rotatable and axially shiftable relation thereto, said means comprising spiral guide means associated with said rim part and leading transversely of the plane thereof, a complementary guide element, and adjustable connecting means between said complementary guide element and said body part, operable to position said guide element selectively in relatively loose and relatively tight cooperative engagement with said spiral guide means.

18. In a vehicle wheel, a body part, a rim part, and means for operatively mounting said rim part on said body part in rotatable and axially shiftable relation thereto, said means comprising spiral guide means associated with said rim part and leading transversely of the plane thereof, a complementary guide element, and radially adjustable connecting means between said complementary guide element and said body part, operable to selectively position said guide element in relatively loose and relatively tight cooperative engagement with said spiral guide means.

19. In a vehicle wheel, a body part, a rim part, and means for operatively mounting said rim part on said body part in rotatable and axially shiftable relation thereto, said means comprising spiral guide means associated with said rim part and leading transversely of the plane thereof, a complementary guide element skewable relative to an axis extending transversely of said plane, and connecting means between said guide element and said body part operable to mount said guide element on said body part in relatively loose cooperative engagement with said spiral guide means, and to skew said guide element into lateral relatively tight cooperative engagement with said spiral guide means 20. In a vehicle wheel, a body part, a rim part, and means for operatively mounting said rim part on said body part in rotatable and axially shiftable relation thereto, said means comprising spiral guide means associated with said rim part and leading transversely of the plane thereof, a connecting element extending transversely of said plane and mounted on said body part for adjustment to radially protracted and retracted positions thereon, a complementary guide element skewably mounted on said connecting element in cooperative engagement with said spiral guide means and operative upon adjustment of said connecting element to said radially protracted and retracted positions, respectively, to tighten and loosen said rim part radially on said body part, and means operable to skew said complementary guide element relative to said connecting element into lateral relatively tight cooperative engagement with said spiral guide means.

21. In a vehicle wheel, an inner wheel part, an outer wheel part surrounding said inner wheel part, and means for operatively mounting said outer wheel part on said inner wheel part in rotatable and axially shiftable relation thereto, said means comprising spiral guide means connected with one of said wheel parts and leading transversely of the plane thereof, a plurality of runner elements operatively associated with the other of said wheel parts in circumferentially spaced relation to each other and in cooperative engagement with said spiral guide means and movable therealong upon relative rotation of said wheel parts to thereby cause adjustment of said outer wheel part axially of said inner wheel part, and releasable locking means operable to secure said outer wheel part in different axially adjusted positions thereof.

22. In a vehicle wheel, an inner wheel part, an outer wheel part surrounding said inner wheel part, and means for operatively mounting said outer wheel part on said inner wheel part in rotatable and axially shiftable relation thereto, said means comprising a plurality of individual parallel spiral tracks formed on one of said wheel parts and leading transversely of the plane thereof, a plurality of runner elements operatively interposed between the other of said wheel parts and said tracks, respectively, and movable along their respective tracks upon relative rotation of said wheel parts to thereby cause axial adjustment of said outer wheel part to different operative positions on said inner wheel part, and releasable locking means operable to connect said outer wheel part, in any of said operative positions thereof, with said inner wheel part for rotation in unison therewith.

23. In a vehicle wheel, a body part, a rim part, spiral guide means associated with said rim part and leading transversely of the plane thereof, means for rotatably mounting said body part on said spiral guide means comprising a plurality of runner elements connected with said body part in circumferentially spaced relation to each other and in cooperative engagement with said guide means and movable therealong upon relative rotation of said body and rim parts to thereby cause adjustment of said rim part axially of said body part, and releasable locking means operable to secure said rim part in different axially adjusted positions thereof.

24. In a vehicle wheel, a body part, a rim part, and means for operatively mounting said rim part on said body part in rotatable and axially shiftable relation thereto, said means comprising a plurality of individual parallel spiral tracks formed on said rim part and leading transversely of the plane thereof, a plurality of runner elements operatively interposed between said body part and said tracks, respectively, and movable along their respective tracks upon relative rotation of said body and rim parts to thereby cause axial adjustment of said rim part to different operative positions on said body part, and releasable locking means operable to connect said rim part, in any of said operative positions thereof, with said body part for rotation in unison therewith.

25. In a vehicle wheel, a body part, a rim part, and means for operatively mounting said rim part on said body part in rotatable and axially shiftable relation thereto, said means comprising a plurality of individual parallel spiral tracks formed on said rim part and leading transversely of the plane thereof, a plurality of runner elements connected with said body part and operatively associated, respectively, with said tracks and movable therealong upon relative rotation of said body and rim parts to thereby cause adjustment of said rim part axially of said body part, a control member connectable with one of said tracks in different positions of adjustment longitudinally thereof and abuttable by the runner element associated with said one track to establish a one-way driving connection between said body and rim parts in different axially adjusted positions of said rim part, and releasable locking means operable to secure said rim part in any of said axially adjusted positions thereof.

26. In a vehicle wheel, a body part, a rim part, and means for operatively mounting said rim part on said body part in rotatable and axially shiftable relation thereto, said means comprising a plurality of individual parallel spiral tracks formed on said rim part and leading transversely of the plane thereof, a plurality of runner elements connected with said body part and operatively associated, respectively, with said tracks and movable therealong upon relative rotation of said body and rim parts to thereby cause adjustment of said rim part axially of said body part, a control member connectable with one of said tracks in different positions of adjustment longitudinally thereof and abuttable by the runner element associated with said one track to establish a one-way driving connection between said body and rim parts in different axially adjusted positions of said rim part, and an auxiliary control member connectable with said one track in different positions of adjustment longitudinally thereof and abuttable by the runner element associated with said one track to secure said rim part in any of said axially adjusted positions thereof.

27. In a vehicle wheel, a body part, a rim part, and means for operatively mounting said rim part on said body part in rotatable and axially shiftable relation thereto, said means comprising a plurality of individual parallel spiral tracks formed on said rim part and leading transversely of the plane thereof, a pair of end stops provided on one of said tracks and determining operative axially adjusted limit positions of said rim part relative to said body part, a plurality of runner elements connected with said body part and operatively associated, respectively, with said tracks and movable therealong upon rotation of said body part relative to said rim part in opposite directions to thereby cause adjustment of said rim part to said limit positions and engagement of said one runner element with one or the other of said end stops, and a control member connectable with said one track in different positions of adjustment longitudinally thereof and abuttable by said one runner element to establish a one-way driving connection between said body and rim parts.

28. In a vehicle wheel, a body part, a rim part, and means for operatively mounting said rim part on said body part in rotatable and axially shiftable relation thereto, said means comprising a plurality of parallel spiral rail members projecting inwardly from the inner periphery of said rim part and leading transversely of the plane of said rim part, a plurality of runner elements, one on each of said rail members, supportingly connected with said body part, each of said runner elements having a grooved portion straddling its respective rail member and being movable therealong upon relative rotation of said body and rim parts, to thereby cause adjustment of said rim part axially of said body part to different operative positions thereon, and releasable locking means operable to connect said rim part, in any of said operative positions thereof, with said body part for rotation in unison therewith.

29. In a vehicle wheel, a body part, a rim part, and means for mounting said rim part on said body part in rotatable and axially adjustable relation thereto, said means comprising a plurality of individual parallel spiral tracks formed on said rim part and leading transversely of the plane thereof, a plurality of runner elements movable, respectively, along said tracks and cooperatively associated therewith and with said body part to cause adjustment of said rim part axially of said body part upon relative rotation of said body and rim parts, and connecting means between each of said runner elements and said body part operable to mount said runner elements on said body part in cooperative engagement, respectively, with said tracks, each of said connecting means being individually adjustable to operatively secure its associated runner element in different positions of axial adjustment on said body part.

30. In a vehicle wheel, a body part, a rim part, and means for mounting said rim part on said body part in rotatable and axially adjustable relation thereto, said means comprising a plurality of individual parallel spiral tracks formed on said rim part and leading transversely of the plane thereof, a plurality of runner elements movable, respectively, along said tracks and cooperatively associated therewith and with said body part to cause adjustment of said rim part axially of said body part upon relative rotation of said body and rim parts, and connecting means between each of said runner elements and said body part, each of said connecting means being individually operable, while said body and rim parts occupy a predetermined position of axial adjustment relative to each other, to selectively secure its associated runner element on said body part in cooperative engagement with one or another of said tracks.

31. In a tractor having a pair of transversely spaced propelling wheels and an upwardly arched axle structure in the space between said wheels, the combination of a pair of power driven elements forming radial inner parts, respectively, of said supporting wheels and rotatably mounted at a predetermined axial spacing from each other on depending side portions of said axle structure and extending vertically beyond the upper ends of said depending side portions, a pair of annular elements forming outer parts, respectively, of said supporting wheels, and means at opposite sides, respectively, of said tractor for operatively mounting said outer wheel parts on their associated inner wheel parts in rotatable and axially shiftable relation thereto, each of said means comprising shift means associated with the respective inner wheel part and its associated outer wheel part and operable by rotation of said inner wheel part relative to said outer wheel part to widen and shorten the axial spacing between said outer wheel parts, and releasable locking means operable to secure the respective inner and outer wheel parts together for rotation in unison with each other in opposite directions after said outer wheel parts have been adjusted to relatively short or wide axial spacings from each other.

32. In a tractor having a pair of transversely spaced propelling wheels and an upwardly arched axle structure in the space between said wheels, the combination of a pair of power driven elements forming radial inner parts, respectively, of said supporting wheels and rotatably mounted at a predetermined axial spacing from each other on depending side portions of said axle structure, a pair of annular elements forming outer parts, respectively, of said supporting wheels, and means at opposite sides, respectively, of said tractor for operatively mounting said outer wheel parts on their associated inner wheel parts in rotatable and axially shiftable relation thereto, each of said means comprising spiral guide means associated, respectively, with the respective outer wheel part and leading transversely of the plane thereof, complementary guide means associated with the respective inner wheel part in cooperative engagement with said spiral guide means, said complementary guide means being of substantially shorter effective length than said spiral guide means and operative upon rotation of the respective inner wheel part relative to its associated outer wheel part to widen and shorten the axial spacing between said outer wheel parts, and releasable locking means operable to secure the respective inner and outer wheel parts together for rotation in unison with each other in opposite directions after said outer wheel parts have been adjusted to relatively short or wide axial spacings from each other.

33. In a tractor having a pair of transversely spaced propelling wheels and an upwardly arched axle structure in the space between said wheels, the combination of a pair of power driven elements forming radial inner parts, respectively, of said wheels and being rotatably mounted on depending side portions of said axle structure at a predetermined axial spacing from each other, a pair of annular elements forming outer parts, respectively, of said wheels and surrounding said inner wheel parts at radial spacings from the respective centers thereof greater than the vertical distances of said centers from the upper ends of the adjacent side portions of said axle structure, and means at opposite sides, respectively, of said tractor for operatively mounting said outer wheel parts on their associated inner wheel parts in rotatable and axially shiftable relation thereto, said means comprising shift means associated with the respective inner wheel part and its associated outer wheel part and operable by rotation of said inner wheel part relative to its associated outer wheel part to move said outer wheel part to an axially adjusted position in overhanging relation to said inner wheel part at the axially outer side thereof and to an axially adjusted position in overhanging relation to said inner wheel part at the axially inner side thereof and in axially overlapping relation to the adjacent depending side portion of said axle structure, and releasable locking means operable to secure the respective inner and outer wheel parts together for rotation in unison with each other in opposite directions upon movement of said outer wheel part to either of said axially adjusted positions thereof.

34. A device for changing the tread spacing of the ground wheels of a vehicle in which an annular outer part of at least one of said wheels is mounted on an inner wheel part in rotatable and axially shiftable relation thereto, and which device functions in response to forward and reverse rotation of one of said wheel parts relative to the other to shift said outer wheel part axially in opposite directions on said inner wheel part, said device comprising relatively abuttable driving means associated, respectively, with said inner and outer wheel parts and operative to transmit forward rotation of said one wheel part to the other upon shifting of said outer wheel part from one axially adjusted position thereof to another, and to transmit reverse rotation of said one wheel part to the other upon shifting of said outer wheel part from said other to said one axially adjusted position thereof, and releasable locking means operable to secure said one wheel part against forward rotation relative to said other wheel part after said outer wheel part has been shifted to said one axially adjusted position thereof, and to secure said one wheel part against reverse rotation relative to said outer wheel part after said outer wheel part has been shifted to said other axially adjusted position thereof.

35. A device for changing the tread spacing of the ground wheels of a vehicle in which an annular outer part of at least one of said wheels is mounted on an inner wheel part in rotatable and axially shiftable relation thereto, and which device functions in response to forward and reverse rotation of one of said wheel parts relative to the other to shift said outer wheel part axially in opposite directions on said inner wheel part, said device comprising, abutment means associated with said one wheel part for rotation in unison therewith relative to said other wheel part in opposite directions, a control abutment, connecting means cooperable with said control abutment and with said other wheel part to secure said control abutment on said other wheel part selectively in predetermined positions for cooperative engagement of said control abutment with said abutment means upon shifting of said outer wheel part to predetermined axially adjusted positions, said cooperative engagement of said control abutment with said abutment means being effective to limit rotation of said one wheel part in one direction relative to the other, and releasable locking means operable to secure said one wheel part against rotation relative to said other wheel part in the opposite direction after said outer wheel part has been shifted to any of said axially adjusted positions thereof.

36. A device for changing the tread spacing of the ground wheels of a vehicle in which an annular outer part of at least one of said wheels is mounted on an inner wheel part in rotatable and axially shiftable relation thereto, and which device functions in response to forward and reverse rotation of one of said wheel parts relative to the other to shift said outer wheel part axially in opposite directions on said inner wheel part, said device comprising abutment means associated with said one wheel part for rotation in unison therewith relative to said other wheel part in forward and reverse directions, a pair of control abutments, connecting means cooperable with one of said control abutments and with said other wheel part to secure said one control abutment on said other wheel part selectively in predetermined positions for cooperative engagement of said one control abutment with said abutment means upon shifting of said outer wheel part to predetermined axially adjusted positions, said cooperative engagement of said one control abutment with said abutment means being effective to limit forward rotation of said one wheel part relative to the other, and connecting means cooperable with the other of said control abutments and with said other wheel part to secure said other control abutment on said other wheel part selectively in predetermined positions for cooperative engagement of said other control abutment with said abutment means upon shifting of said outer wheel part to said predetermined axially adjusted positions of the latter, said cooperative engagement of said other control abutment with said abutment means being effective to limit reverse rotation of said one wheel part relative to the other.

37. A device for changing the tread spacing of the ground wheels of a vehicle in which an annular outer part of at least one of said wheels is mounted on an inner wheel part in rotatable and axially shiftable relation thereto, and which device functions in response to forward and reverse rotation of one of said wheel parts relative to the other to shift said outer wheel part axially in opposite directions on said inner wheel part, said device comprising driving abutments on said wheel parts cooperable one with another to automatically establish driving connections between said wheel parts upon axial adjustment of said outer wheel part to predetermined wide or narrow tread spacing relation, and releasable locking means operable to maintain said cooperable driving abutments in operative position to effect either forward or rear driving of said outer wheel part when in either position of axial adjustment.

38. A device for changing the tread spacing of the ground wheels of a vehicle in which an annular outer part of at least one of said wheels is mounted on an inner wheel part in rotatable and axially shiftable relation thereto, said device being operable through coaction of said inner wheel part with said outer wheel part to shift said outer wheel part axially in opposite directions on said inner wheel part and to secure said wheel parts in desired operative condition, and said device comprising driving abutments on said wheel parts cooperable one with another to establish driving connections between said wheel parts when said outer wheel part reaches predetermined axially adjusted condition corresponding to wide or narrow tread spacing relation, and releasable locking means operable to maintain said cooperable driving abutments in operative position to effect either forward or rear driving of said outer wheel part when in either position of axial adjustment.

WALTER F. STREHLOW.

REFERENCES CITED

The following references are of record in the file of this patent:

UNITED STATES PATENTS

| Number | Name | Date |
|---|---|---|
| 2,099,194 | Brown | Nov. 16, 1937 |
| 2,254,358 | Frudden et al. | Sept. 2, 1941 |
| 1,822,093 | Hendrickson et al. | Sept. 8, 1931 |
| 2,240,312 | Minturn | Apr. 29, 1941 |
| 1,415,356 | Jandasek | May 9, 1922 |

FOREIGN PATENTS

| Number | Country | Date |
|---|---|---|
| 421,621 | British | Dec. 27, 1934 |